US007000196B2

(12) United States Patent
Kobayashi

(10) Patent No.: US 7,000,196 B2
(45) Date of Patent: Feb. 14, 2006

(54) DATA ITEM LIST DISPLAY APPARATUS, DATA ITEM LIST DISPLAY METHOD, AND COMPUTER-READABLE RECORDING MEDIUM RECORDED WITH DATA ITEM LIST DISPLAY PROGRAM

(75) Inventor: Yoko Kobayashi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 456 days.

(21) Appl. No.: 09/854,624

(22) Filed: May 15, 2001

(65) Prior Publication Data

US 2001/0035883 A1 Nov. 1, 2001

Related U.S. Application Data

(63) Continuation of application No. PCT/JP99/06433, filed on Nov. 18, 1999.

(30) Foreign Application Priority Data

Nov. 18, 1998 (JP) ................................ 10-328445

(51) Int. Cl.
*G06F 3/00* (2006.01)
*G06F 9/00* (2006.01)
*G06F 17/00* (2006.01)

(52) U.S. Cl. ...................... 715/810; 715/783; 715/708; 715/838; 715/839; 715/846; 715/847

(58) Field of Classification Search ................ 345/783, 345/708, 838, 839, 846, 847; 715/810

See application file for complete search history.

(56) References Cited

U.S. PATENT DOCUMENTS 5,355,497 A * 10/1994 Cohen-Levy ............... 707/200
5,497,484 A * 3/1996 Potter et al. ................ 707/200

(Continued)

FOREIGN PATENT DOCUMENTS

EP 0 717 346 6/1996
JP 6-4258 1/1994

(Continued)

OTHER PUBLICATIONS

Gavron, Jacquelyn et al., How to Use Microsoft Windows NT4 Workstation, 1996, Ziff-Davis Press, p. 35, ISBN 1-56276-445-4.*

(Continued)

*Primary Examiner*—Kristine Kincaid
*Assistant Examiner*—Ryan F. Pitaro
(74) *Attorney, Agent, or Firm*—Staas & Halsey LLP

(57) ABSTRACT

According to the present invention, a plurality of data items are displayed in different display forms corresponding to attributes of the data items in a list by recording a computer-readable recording medium with a data item list display program for causing a computer to display the data items in the different display forms in the list, the display forms corresponding to the respective attributes of the data items. Therefore, a data item can be displayed in the same display format in a list of data items of different attributes and in a list of data items of a single attribute, thus allowing users to easily understand the lists without confusion.

17 Claims, 34 Drawing Sheets

U.S. PATENT DOCUMENTS

| | | | | | |
|---|---|---|---|---|---|
| 5,557,787 | A | * | 9/1996 | Shin et al. | 707/102 |
| 5,706,449 | A | * | 1/1998 | Liu et al. | 345/823 |
| 5,907,323 | A | * | 5/1999 | Lawler et al. | 725/41 |
| 5,933,145 | A | * | 8/1999 | Meek | 345/835 |
| 6,014,135 | A | * | 1/2000 | Fernandes | 345/744 |
| 6,043,817 | A | * | 3/2000 | Bolnick et al. | 715/788 |

FOREIGN PATENT DOCUMENTS

| | | |
|---|---|---|
| JP | 7-36655 | 2/1995 |
| JP | 8-263255 | 10/1996 |
| JP | 8-263256 | 10/1996 |

OTHER PUBLICATIONS

T. Hirono, "Shittete Tokusuru Windows 95 Tips Shu, Part II (in Japanese)", DOS/V Power Report Henshubu, vol. 8, No. 5, May 1998.

* cited by examiner

| ATTRIBUTE | FIRST ITEM | SECOND ITEM | THIRD ITEM | FOURTH ITEM |
|---|---|---|---|---|
| MAIL | (seq 1) Mailing list has been opened. | 1998/ 4/30(Th.) 10:32:21 | Yoko Kobayashi | jave-grp@prs.cs.fujitsu.co.jp |
| TO DO | Progress meeting every Monday.<br>Prepare materials on progress. | 1998/ 4/30(Th.) 11:42:11 | 1998/6/30(Fr.) | |
| CALENDER | Progress meeting | 1998/ 5/10(Sun.)13:45:71 | 1998/5/22(Mon.)10:00 | 1998/5/22(Mon.)16:00 |
| FORUM | Objection to the Task View concept. | 1998/ 4/31(Fr.) 12:25:45 | Wu WuWu | Task View Forum |
| ADDRESS | Toshiyuki Chisaka | 1998/ 4/20(Mon.)16:30:10 | 7128-4335 | Project Manager,<br>MW Third Development Dept. |
| MAIL | (seq 2) RE: Mailing list has been opened. | 1998/ 4/30(Th.) 10:40:10 | Naoto Kiriyama | jave-grp@prs.cs.fujitsu.co.jp |
| MEMO | Storage area of prior art search system | 1998/ 4/30(Th.) 11:25:45 | | |
| FORUM | Specification form | 1997/12/10(Mon.)09:40:10 | Wu WuWu | Patent Forum |

(B)

| FIFTH ITEM | CONTENT ITEM |
|---|---|
| Read | To the members of the Korean Food Research Project: Mailing list has been opened.<br>Let's use it. ¥n |
| | Prepare materials on progress as the progress meeting is held every Monday. |
| SSC Meeting Room | A meeting room for the progress meeting has been reserved. Please attend the meeting. |
| | I do not understand some part of the Task View basic concept, so please give me a comment. |
| Shinmaruko1-1-1 | Manager working on the fourth floor of the SSC Building. |
| Unread | OK. Thank you for your mail. ¥nBy KIRIYAMA |
| | Please checck ¥¥KOUT1 of the server. |
| | I have made a specification. |

FIG. 9

| DISPLAY FORMAT NAME | DISPLAY METHOD | ICON NO. | COLUMN NAME | FONT | FONT SIZE | FONT COLOR | CONTENT DISPLAY | DISPLAY CONDITIONS | AREA SIZE OF DATA ITEM |
|---|---|---|---|---|---|---|---|---|---|
| MAIL FORMAT 1 | DETAILS | 1 | MAIL COLUMN | MINCHO/ BOLD | 11 | BLACK | NO | ATTRIBUTE=MAIL AND STATE=READ | H20×W1000 |
| MAIL FORMAT 2 | DETAILS | 1 | MAIL COLUMN | MINCHO/ BOLD | 11 | BLACK | YES | ATTRIBUTE=MAIL AND STATE=UNREAD | H80×W1000 |
| TO DO FORMAT | DETAILS | 2 | TO DO COLUMN | GOTHIC | 11 | BLACK | NO | ATTRIBUTE=TO DO | H20×W800 |
| CALENDAR FORMAT | DETAILS | 3 | CALENDAR COLUMN | GOTHIC | 11 | BLACK | NO | ATTRIBUTE=CALENDER | H20×W1300 |
| FORUM FORMAT① | DETAILS | 4 | FORUM COLUMN | GOTHIC | 11 | BLACK | NO | ATTRIBUTE=FORUM AND WRITING TIME≧1998/1/1 | H20×W1150 |
| FORUM FORMAT② | LIST | 15 | FORUM COLUMN | GOTHIC | 11 | BLACK | NO | ATTRIBUTE=FORUM AND WRITING TIME<1998/1/1 | H20×W1150 |
| MEMO FORMAT | LARGE ICONS | 6 | MEMO COLUMN | GOTHIC | 11 | BLACK | NO | ATTRIBUTE=MEMO | H60×W60 |
| ADDRESS FORMAT | SMALL ICONS | 5 | ADDRESS COLUMN | GOTHIC | 11 | BLACK | NO | ATTRIBUTE=ADDRESS | H20×W200 |

| COLUMN NAME | FIRST COLUMN | | | SECOND COLUMN | | |
|---|---|---|---|---|---|---|
| | ICON NO. | HEADING | WIDTH | ICON NO. | HEADING | WIDTH |
| MAIL COLUMN | 7 | TITLE | 400 | 15 | RECEPTION DATA AND TIME | 200 |
| TO DO COLUMN | 2 | SCHEDULE | 400 | 12 | WRITING DATE AND TIME | 200 |
| CALENDAR COLUMN | 9 | HEADING | 400 | 12 | WRITING DATE AND TIME | 200 |
| FORUM COLUMN | 4 | HEADING | 400 | 12 | WRITING TIME | 200 |
| MEMO COLUMN | 6 | MEMO | 400 | 12 | WRITING DATE AND TIME | 200 |
| ADDRESS COLUMN | 5 | NAME | 200 | 12 | ENTRY DATE AND TIME | 200 |

(B)

| THIRD COLUMN | | | FOURTH COLUMN | | | FIFTH COLUMN | | |
|---|---|---|---|---|---|---|---|---|
| ICON NO. | HEADING | WIDTH | ICON NO. | HEADING | WIDTH | ICON NO. | HEADING | WIDTH |
| 10 | SENDER | 200 | NONE | ADDRESS | 200 | | | |
| NONE | EXPECTED COMPLETION DATE | 200 | | | | | | |
| 8 | START TIME | 250 | 8 | FINISH TIME | 250 | 13 | PLACE | 200 |
| 10 | SENDER | 200 | 11 | FORUM NAME | 350 | | | |
| | | | | | | | | |
| 13 | TITLE | 200 | 15 | PHONE NUMBER | 200 | 16 | ADDRESS | 200 |

FIG.11

| ICON NO. | ICON NAME |
|---|---|
| 1 | Mail |
| 2 | TODO |
| 3 | Calendar |
| 4 | Forum |
| 5 | Address |
| 6 | Memo |
| 7 | Subject |
| 8 | Watch |
| 9 | Bord |
| 10 | Human |
| 11 | Desk |
| 12 | Clock |
| 13 | Place |
| 14 | Name |
| 15 | Horse |
| 16 | Dog |

| ATTRIBUTE | FIRST ITEM | SECOND ITEM | THIRD ITEM | FOURTH ITEM |
|---|---|---|---|---|
| MAIL | (seq 1) Mailing list has been opened. | 1998/ 4/30 (Th.) | Yoko Kobayashi | jave-grp@prs.cs.fujitsu.co.jp |
| TO DO | Progress meeting every Monday.<br>Prepare materials on progress. | 1998/ 4/30 (Th.) | 1998/6/30(Fr.) | |
| CALENDER | Progress meeting | 1998/ 5/10 (Sun.) | 1998/5/22(Mon.)10:00 | 1998/5/22(Mon.)16:00 |
| FORUM | Objection to the Task View concept. | 1998/ 4/31 (Fr.) | Wu WuWu | Task View Forum |
| ADDRESS | Toshiyuki Chisaka | 1998/ 4/20 (Mon.) | 7128-4335 | Project Manager,<br>MW Third Development Dept. |
| MAIL | (seq 2) RE: Mailing list has been opened. | 1998/ 4/30 (Th.) | Naoto Kiriyama | jave-grp@prs.cs.fujitsu.co.jp |
| MEMO | Storage area of prior art search system | 1998/ 4/30 (Th.) | 11:25:45 | |
| FORUM | Specification form | 1997/12/10 (Mon.) | Wu WuWu | Patent Forum |

(B)

| FIFTH ITEM | CONTENT ITEM | DISPLAY FORMAT NAME |
|---|---|---|
| Read | To the members of the Korean Food Research Project: Mailing list has been opened.<br>Let's use it. ¥n | MAIL FORMAT 1 |
| | Prepare materials on progress as the progress meeting is held every Monday. | TO DO FORMAT |
| SSC Meeting Room | A meeting room for the progress meeting has been reserved. Please attend the meeting. | CALENDAR FORMAT |
| | *I do not understand some part of the Task View basic concept, so please give me a comment.* | FORUM FORMAT 1 |
| Shinmaruko1-1-1 | Manager working on the fourth floor of the SSC Building. | ADDRESS FORMAT |
| Unread | OK. Thank you for your mail. ¥nBy KIRIYAMA | MAIL FORMAT 2 |
| | Please checck ¥¥KOUT1 of the server. | MEMO FORMAT |
| | I have made a specification. | FORUM FORMAT 2 |

| | 1 | 2 | 3 | 4 | 5 | 6 | 7 | 8 |
|---|---|---|---|---|---|---|---|---|
| VALUE | 4 | 7 | 8 | 2 | 1 | 6 | 3 | 5 |
| DISPLAY FORMAT | A | B | C | A | A | B | A | A |

FOCUSED ON (column 4)

(B)

| | 1 | 2 | 3 | 4 | 5 | 6 | 7 | 8 |
|---|---|---|---|---|---|---|---|---|
| VALUE | 2 | 4 | 7 | 8 | 1 | 6 | 3 | 5 |
| DISPLAY FORMAT | A | A | B | C | A | B | A | A |

(C)

| | 1 | 2 | 3 | 4 | 5 | 6 | 7 | 8 |
|---|---|---|---|---|---|---|---|---|
| VALUE | 1 | 2 | 4 | 7 | 8 | 6 | 3 | 5 |
| DISPLAY FORMAT | A | A | A | B | C | B | A | A |

(D)

| | 1 | 2 | 3 | 4 | 5 | 6 | 7 | 8 |
|---|---|---|---|---|---|---|---|---|
| VALUE | 1 | 2 | 3 | 4 | 7 | 8 | 6 | 5 |
| DISPLAY FORMAT | A | A | A | A | B | C | B | A |

(E)

| | 1 | 2 | 3 | 4 | 5 | 6 | 7 | 8 |
|---|---|---|---|---|---|---|---|---|
| VALUE | 1 | 2 | 3 | 4 | 5 | 7 | 8 | 6 |
| DISPLAY FORMAT | A | A | A | A | A | B | C | B |

FIG. 29

(A) LIST DISPLAY ITEMS

| ATTRIBUTE | FIRST ITEM | SECOND ITEM | THIRD ITEM | FOURTH ITEM | FIFTH ITEM |
|---|---|---|---|---|---|
| MAIL | (seq 1) Mailing list has been opened. | 1998/4/30(Th.)10:32:21 | Yoko Kobayashi | java-grp@prs.cs.fujitsu.co.jp | Read |
| TO DO | Progress meeting every Monday. Prepare materials on progress | 1998/4/30(Th.)11:42:41 | 1998/6/30(Fr.) | | |
| CALENDAR | Progress meeting | 1998/5/10(Sun.)13:45:71 | 1998/5/22(Mon.)10:00 | 1998/5/22(Mon.)16:00 | SSC Meeting Room |
| FORUM | Objection to the Task View concept. | 1998/4/31(Fr.)12:25:45 | Wu Wuwu | TaskView Forum | |
| ADDRESS | Toshiyuki Chisaka | 1998/4/20(Mon.)16:30:10 | 7128-4335 | Project Monager,MW Third Development Dept. | Shinmaruko1-1-1 |
| MAIL | (seq 2) RE: Mailing list has been opened. | 1998/4/30(Th.)10:40:10 | Naoto Kiriyama | java-grp@prs.cs.fujitsu.co.jp | Unread |
| MEMO | Storage area of prior art search system | 1998/4/30(Th.)11:25:45 | | | |
| FORUM | Specification form | 1997/12/10(Mon.)09:40:10 | Wu Wuwu | Patent Forum | |

(B)

| CONTENT ITEM |
|---|
| To the members of the Korean Food Research Project: Mailing list has been opened. Let's use it. ¥n KOBAYASHI |
| Prepare materials on progress as the progress meeting is held every Monday. |
| A meeting room for the progress meeting has been reserved. Please attend the meeting. |
| I do not understand some part of the Task View basic concept, so please give me a comment. |
| Manager working on the fourth floor of the SSC Building. |
| OK. Thank you for your mail. ¥nBy KIRIYAMA |
| Please check ¥¥KOUTI of the server. |
| I have made a specification. |

FIG. 30

(A) DISPLAY FORMAT MASTER

| DISPLAY FORMAT NAME | DISPLAY METHOD | ICON NO. | COLUMN | FONT | FONT SIZE | FONT COLOR | CONTENT DISPLAY |
|---|---|---|---|---|---|---|---|
| MAIL FORMAT 1 | DETAILS | 1 | MAIL COLUMN | MINCHO/BOLD | 16 | BLACK | NO |
| MAIL FORMAT 2 | DETAILS | 1 | MAIL COLUMN | MINCHO/BOLD | 11 | BLACK | YES |
| TO DO FORMAT | DETAILS | 2 | TO DO COLUMN | GOTHIC | 11 | BLUE | NO |
| CALENDAR FORMAT | DETAILS | 3 | CALENDAR COLUMN | Times New Roman | 11 | BLACK | NO |
| FORUM FORMAT1 | DETAILS | 4 | FORUM COLUMN | GOTHIC | 22 | BLACK | NO |
| FORUM FORMAT2 | LIST | 15 | FORUM COLUMN | GOTHIC | 11 | BLACK | NO |
| MEMO FORMAT | LARGE ICONS | 6 | MEMO COLUMN | GOTHIC | 11 | BLACK | NO |
| ADDRESS FORMAT | SMALL ICONS | 5 | ADDRESS COLUMN | Courier New | 11 | BLACK | NO |

(B)

| DISPLAY CONDITIONS | AREA SIZE OF DATA ITEM |
|---|---|
| ATTRIBUTE=MAIL AND STATE=READ | H20×W1000 |
| ATTRIBUTE=MAIL AND STATE=UNREAD | H50×W1500 |
| ATTRIBUTE=TO DO | H20×W800 |
| ATTRIBUTE=CALENDAR | H20×W1300 |
| ATTRIBUTE=FORUM AND WRITING TIME≧1998/1/1 | H20×W1150 |
| ATTRIBUTE=FORUM AND WRITING TIME<1998/1/1 | H20×W1150 |
| ATTRIBUTE=MEMO | H60×W60 |
| ATTRIBUTE=ADDRESS | H20×W200 |

FIG. 31

COLUMN MASTER

| COLUMN NAME | FIRST COLUMN | | | SECOND COLUMN | | | THIRD COLUMN | | | FOURTH COLUMN | | | FIFTH COLUMN | | |
|---|---|---|---|---|---|---|---|---|---|---|---|---|---|---|---|
| | ICON NO. | HEADING | WIDTH | ICON NO. | HEADING | WIDTH | ICON NO. | HEADING | WIDTH | ICON NO. | HEADING | WIDTH | ICON NO. | HEADING | WIDTH |
| MAIL COLUMN | 7 | TITLE | 400 | 15 | RECEPTION DATE AND TIME | 200 | 10 | SENDER | 200 | NONE | ADDRESS | 200 | | | |
| TO DO COLUMN | 2 | SCHEDULE | 400 | 12 | WRITING DATE AND TIME | 200 | NONE | EXPECTED COMPLETION DATE | 200 | | | | | | |
| CALENDAR COLUMN | 9 | HEADING | 400 | 12 | WRITING DATE AND TIME | 200 | 8 | START TIME | 250 | 8 | FINISH TIME | 250 | 13 | PLACE | 200 |
| FORUM COLUMN | 4 | HEADING | 400 | 12 | WRITING TIME | 200 | 10 | SENDER | 200 | 11 | FORUM NAME | 350 | | | |
| MEMO COLUMN | 6 | MEMO | 400 | 12 | WRITING DATE AND TIME | 200 | | | | | | | | | |
| ADDRESS COLUMN | 5 | NAME | 200 | 12 | ENTRY DATE AND TIME | 200 | 13 | ATTRIBUTE | 200 | 15 | PHONE NUMBER | 200 | 16 | ADDRESS | 200 |

FIG.32

ICON MASTER

| ICON NO. | ICON NAME |
|---|---|
| 1 | Mail |
| 2 | TODO |
| 3 | Calendar |
| 4 | Forum |
| 5 | Address |
| 6 | Memo |
| 7 | Subject |
| 8 | Watch |
| 9 | Bord |
| 10 | Human |
| 11 | Desk |
| 12 | Clock |
| 13 | Place |
| 14 | Name |
| 15 | Horse |
| 16 | Dog |

FIG. 33

(A) TABLE OF CORRESPONDENCE BETWEEN LIST DISPLAY ITEMS AND DISPLAY FORMATS

| ATTRIBUTE | FIRST ITEM | SECOND ITEM | THIRD ITEM | FOURTH ITEM | FIFTH ITEM |
|---|---|---|---|---|---|
| MAIL | (seq 1) Mailing list has been opened. | 1998/4/30(Th.)10:32:21 | Yoko Kobayashi | java-grp@prs.cs.fujitsu.co.jp | Read |
| TO DO | Progress meeting every Monday. Prepare materials on progress | 1998/4/30(Th.)11:42:11 | 1998/6/30(Fr.) | | |
| CALENDAR | Progress meeting | 1998/5/10(Sun.)13:45:71 | 1998/5/22(Mon.)10:00 | 1998/5/22(Mon.)16:00 | SSC Meeting Room |
| FORUM | Objection to the Task View concept. | 1998/4/31(Fr.)12:25:45 | Wu Wuwu | TaskView Forum | |
| ADDRESS | Toshiyuki Chisaka | 1998/4/20(Mon.)16:30:10 | 7128-4335 | Project Monager,MW Third Development Dept. | Shinmaruko1-1-1 |
| MAIL | (seq 2) RE: Mailing list has been opened. | 1998/4/30(Th.)10:40:10 | Naoto Kiriyama | java-grp@prs.cs.fujitsu.co.jp | Unread |
| MEMO | Storage area of prior art search system | 1998/4/30(Th.)11:25:45 | | | |
| FORUM | Specification form | 1997/12/10(Mon.)09:40:10 | Wu Wuwu | Patent Forum | |

(B)

| CONTENT ITEM | DISPLAY FORMAT NAME |
|---|---|
| To the members of the Korean Food Research Project: Mailing list has been opened. Let's use it. ¥nYOKO KOBAYASHI | MAIL FORMAT 1 |
| Prepare materials on progress as the progress meeting is held every Monday. | TO DO FORMAT |
| A meeting room for the progress meeting has been reserved. Please attend the meeting. | CALENDAR FORMAT |
| I do not understand some part of the Task View basic concept, so please give me a comment. | FORUM FORMAT1 |
| Manager working on the fourth floor of the SSC Building. | ADDRESS FORMAT |
| OK. Thank you for your mail. ¥nBy KIRIYAMA | MAIL FORMAT2 |
| Please check ¥¥KOUTI of the server. | MEMO FORMAT |
| I have made a specification. | FORUM FORMAT2 |

GIF IMAGE 843X527 PIXELS

DATA ITEM LIST DISPLAY APPARATUS, DATA ITEM LIST DISPLAY METHOD, AND COMPUTER-READABLE RECORDING MEDIUM RECORDED WITH DATA ITEM LIST DISPLAY PROGRAM

This application is a continuing application filed under 35 U.S.C. §111(a), based upon International Application PCT/JP99/06433, filed Nov. 18, 1999, it being further noted that priority is based upon Japanese Patent Application 10-328445, filed Nov. 18, 1998.

TECHNICAL FIELD

The present invention relates to data item list display apparatuses, data item list display methods, and computer-readable recording media recorded with data item list display programs, and more particularly to a data item display apparatus, a data item list display method, and a computer-readable recording medium recorded with a data item list display program for displaying data items of different attributes.

BACKGROUND ART

Groupware utilizing recent LAN or intranet technologies has been widely used so that more and more users share communication or information. The groupware has been required to have a variety of functions and to be easy to use. Therefore, it is necessary to display a variety of data items in a groupware server in a list so that the data items are easy to recognize visually and to use.

In the groupware, information of data items of a variety of attributes such as MAIL, SCHEDULE, MEMO, FORUM, LIBRARY, and DOCUMENT simultaneously exists. A user may select necessary information therefrom and store the selected information in a folder used exclusively for the selected information. Then, the user may reuse the selected information. In such a folder, a large number of data items of different attributes are stored.

A conventional display apparatus, when displaying a large number of data items of different attributes in a list, displays the data items uniformly in a list format.

FIG. 1 is a diagram showing a conventional list using large icons. In this list, data items are displayed in large icons that are arranged successively from top to bottom in rows. Each of data item attributes is represented by a corresponding large icon type. FIG. 2 is a diagram showing a conventional list using small icons. In this list, data items are displayed in small icons that are arranged successively from top to bottom in rows. Each of data item attributes is represented by a corresponding small icon type.

FIG. 3 is a diagram showing a conventional list in a list format. In this list, each data item is displayed by a set of a small icon and its name arranged in a row. The rows of the sets are arranged from top to bottom. Each of data item attributes is represented by a corresponding small icon type. FIG. 4 is a diagram showing a conventional list in a detailed format. In this list, each data item is displayed by a set of a small icon, its name, size, and modified date arranged in a row. The rows of the sets are arranged from top to bottom. Each of data item attributes is represented by a corresponding small icon type.

In a conventional display apparatus, a data item list is displayed all by using only large icons or all by using only small icons, and data item attributes are only distinguished by icon types. However, data items of a single attribute are displayed all in the same icon size that is predetermined to be large or small. For instance, in a list of data items of a folder storing only mail data, the data item of each mail data is displayed in a large icon, and in a list of data items of a folder storing only memo data, the data item of each memo data is displayed in a small icon. Therefore, a list of data items of different attributes and a list of data items of a single attribute are displayed in different display formats, thus making it difficult for users to understand those lists.

Further, in the list in the display format shown in FIG. 4, the contents displayed in each column are fixedly determined. Therefore, in displaying data items of different attributes, only somewhat common items such as name, size, type, and modified data can be displayed, thus causing a problem that all the desired information to be displayed of each data item cannot be displayed simultaneously in the list.

DISCLOSURE OF THE INVENTION

It is a general object of the present invention to provide a data item list display apparatus, a data item list display method, and a computer-readable recording medium recorded with a data item list display program by which a data item can be displayed in the same display format in a list of data items of different attributes and in a list of data items of a single attribute so that users can easily understand the lists without confusion.

The above object of the present invention is achieved by a computer-readable recording medium recorded with a data item list display program for causing a computer to function as list display means for displaying a plurality of data items in different display forms in a list, the display forms corresponding to respective attributes of the data items.

According to this recording medium, a plurality of data items are displayed in a list in different display forms corresponding to respective attributes of the data items. Therefore, a data item can be displayed in the same display format in a list of data items of different attributes and in a list of data items of a single attribute. Hence, users can easily understand the lists without confusion. Further, all the desired information of each data item can be displayed, thus making it easy to find objective data from a list.

BRIEF DESCRIPTION OF THE DRAWINGS

Other objects, features and advantages of the present invention will become more apparent from the following detailed description when read in conjunction with the accompanying drawings, in which:

FIG. 8 is a diagram showing a first example of list display items;

FIG. 9 is a diagram showing a structure of a first example of a display format master 62;

FIG. 10 is a diagram showing a structure of a first example of a column master 64;

FIG. 11 is a diagram showing a structure of a first example of an icon master 66;

FIG. 12 is a diagram showing a structure of a first example of a table 68 of correspondence between the list display items and display formats;

FIG. 25 is a diagram for illustrating sorting;

FIG. 29 is a diagram showing a second example of the list display items;

FIG. 30 is a diagram showing a structure of a second example of the display format master 62;

FIG. 31 is a diagram showing a structure of a second example of the column master 64;

FIG. 32 is a diagram showing a structure of a second example of the icon master 66;

FIG. 33 is a diagram showing a structure of a second example of the table 68 of the correspondence between the list display items and the display formats.

BEST MODE FOR CARRYING OUT THE INVENTION

A description will now be given, with reference to the accompanying drawings, of an embodiment of the present invention.

Figure 1:
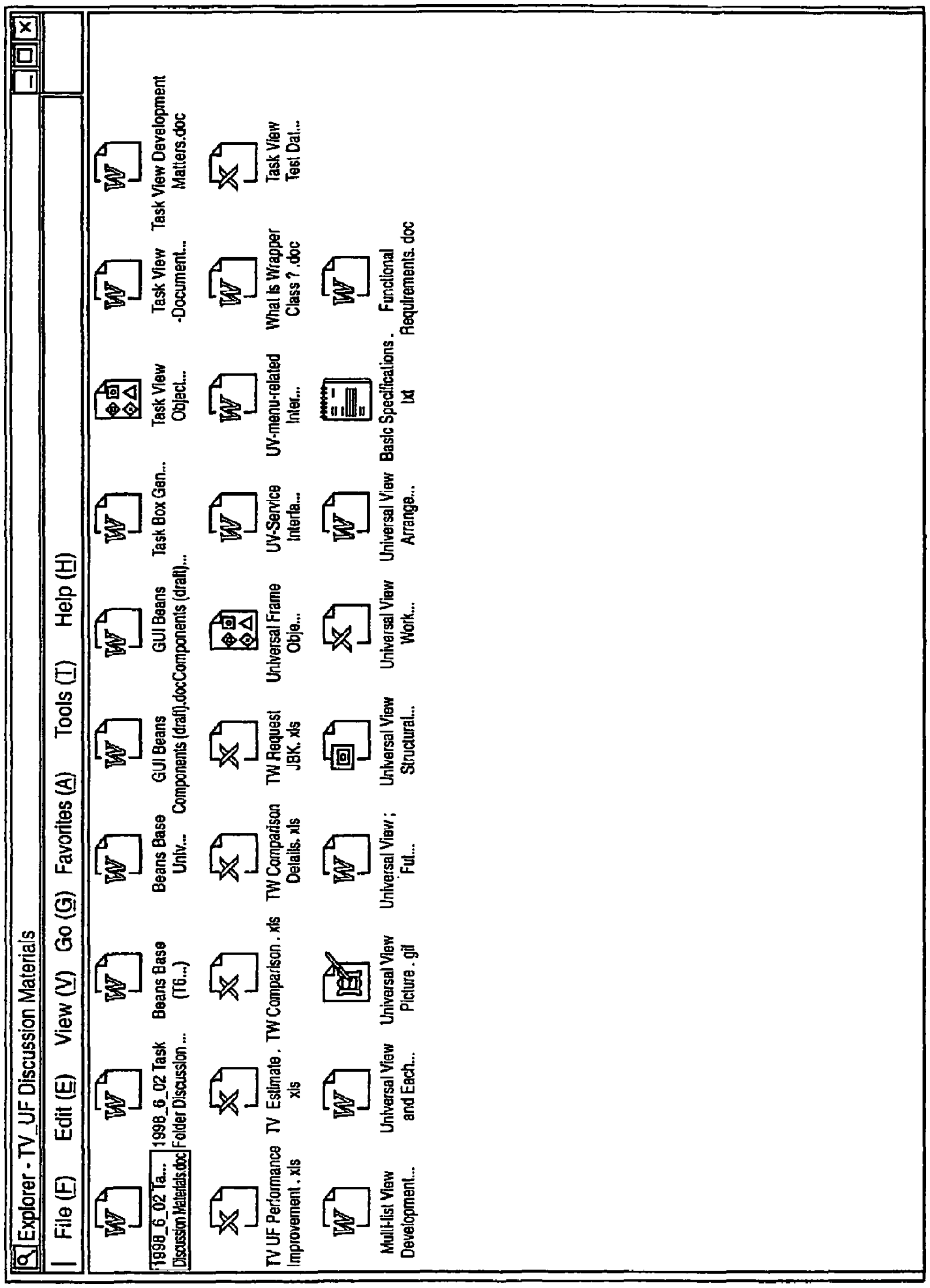
FIG. 1 is a diagram showing a conventional list using large icons.
Figure 2:
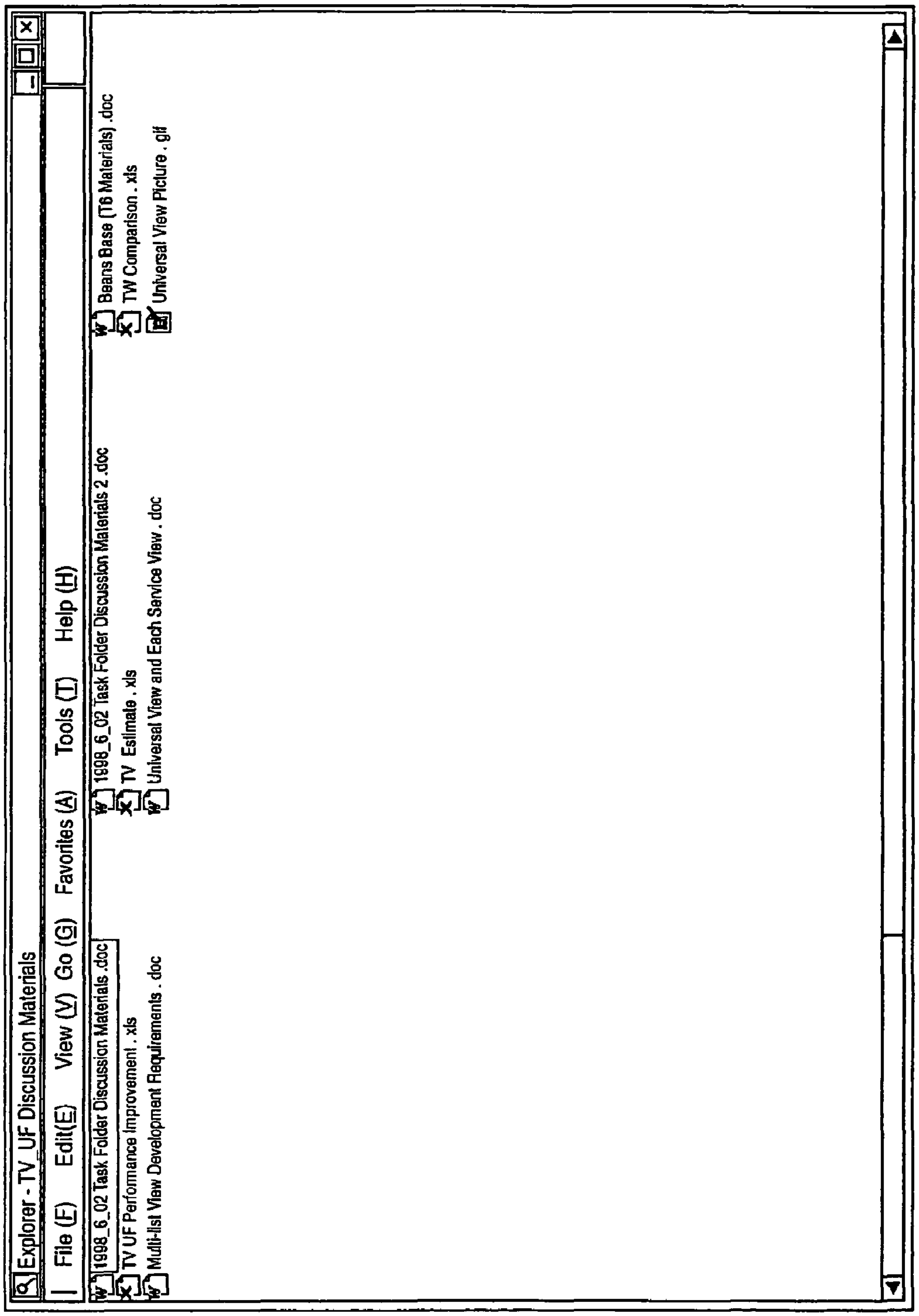
FIG. 2 is a diagram showing a conventional list using small icons.
Figure 3:
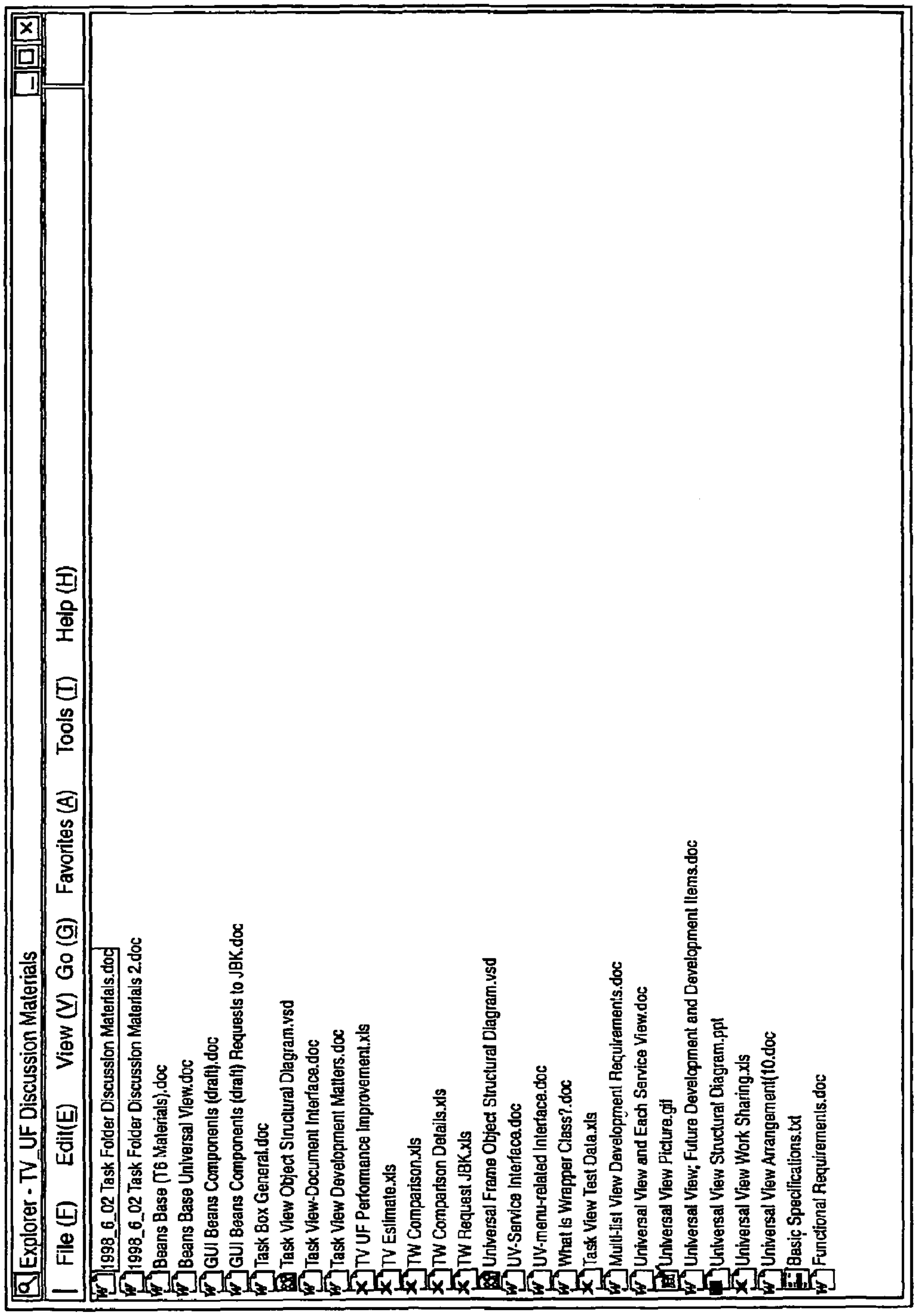
FIG. 3 is a diagram showing a conventional list in a list format.
Figure 4:
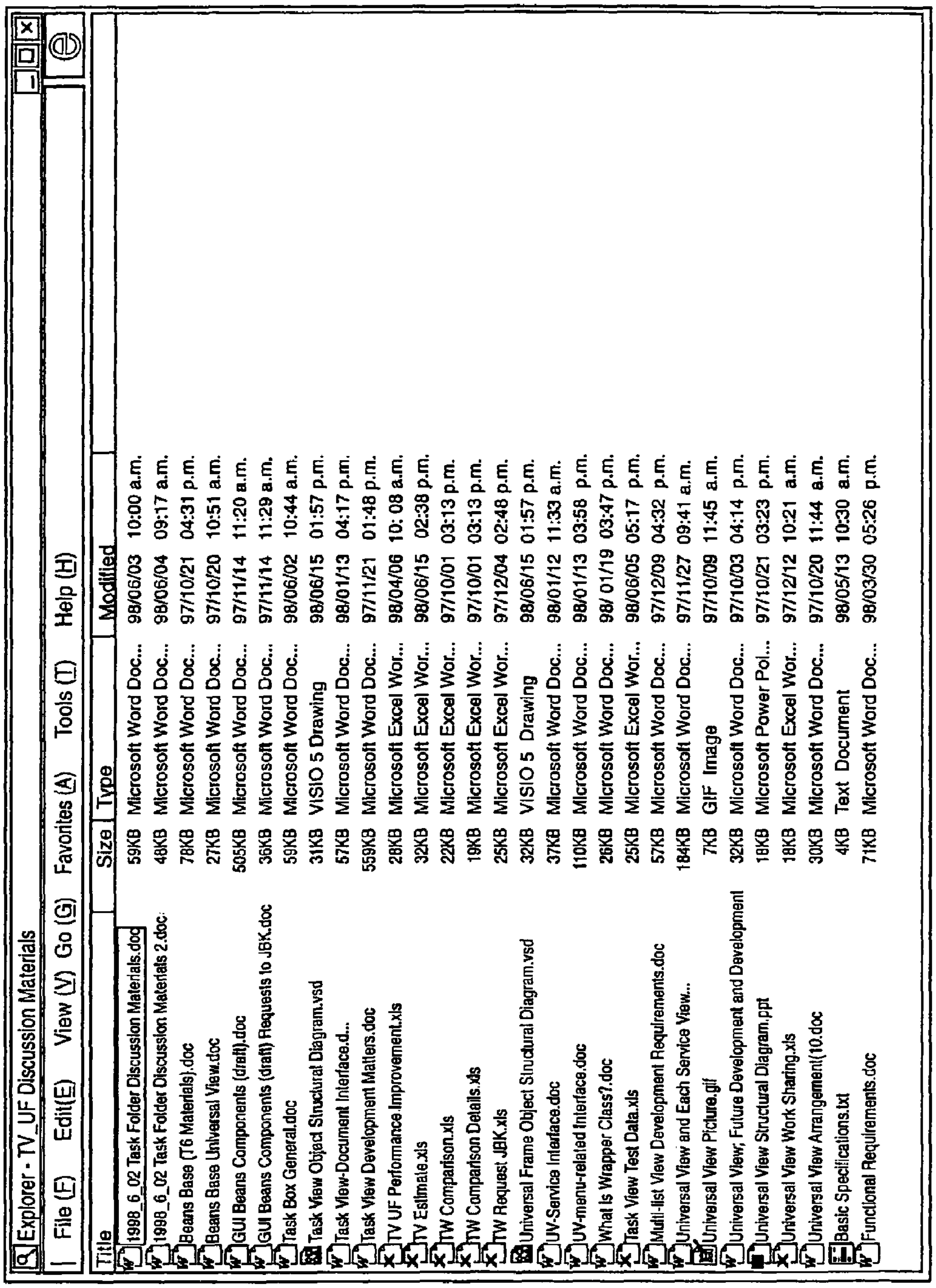
FIG. 4 is a diagram showing a conventional list in a detailed format.
Figure 5:
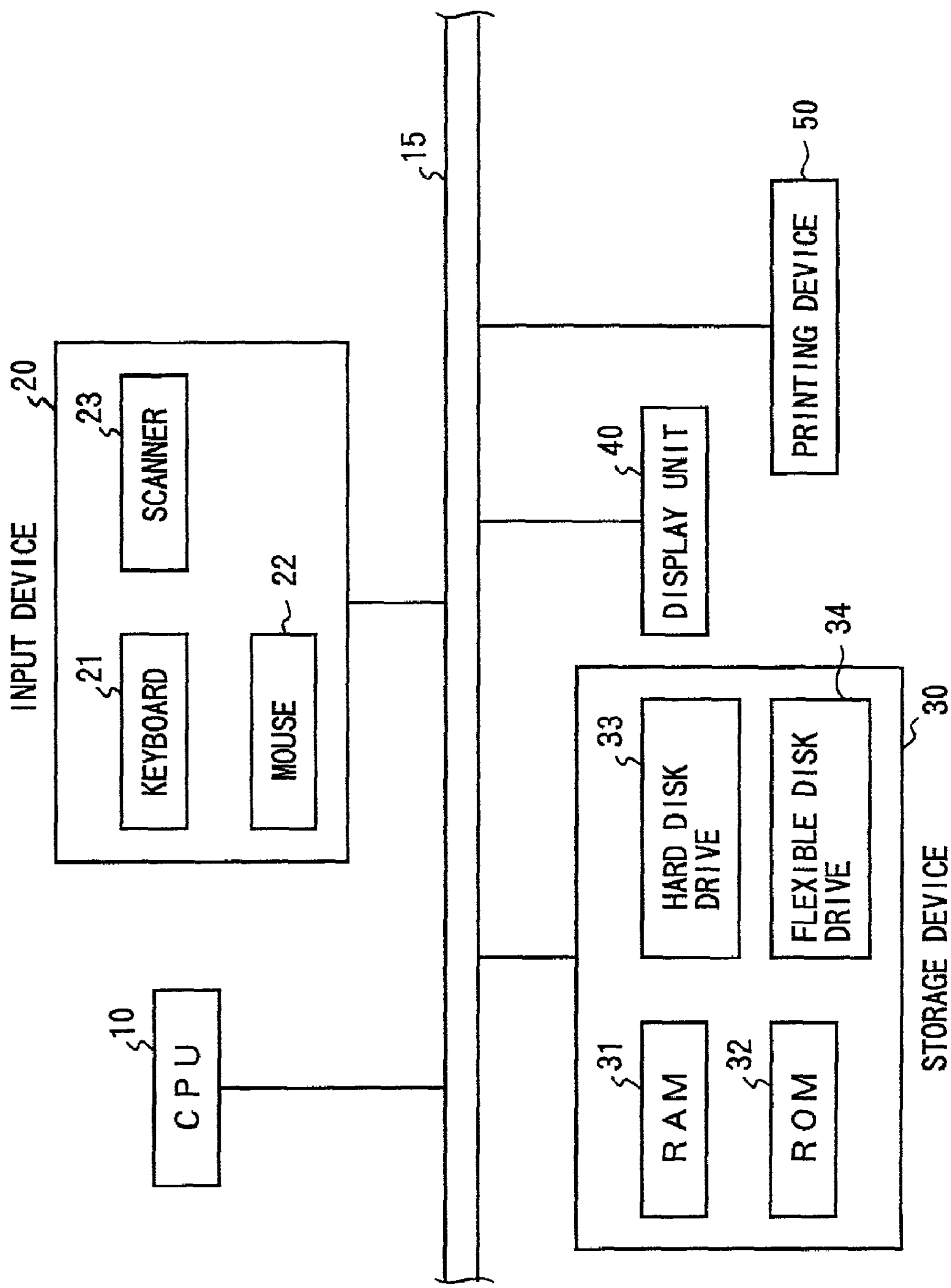
FIG. 5 is a block diagram of a data item list display apparatus according to an embodiment of the present invention.

FIG. 5 is a block diagram of a data item list display apparatus according to the embodiment of the present invention. This data item list display apparatus includes a conventional personal computer and a conventional workstation. In the drawing, an input device 20, a storage device 30, a display unit 40, and a printing device 50 are connected via a bus 15 to a central processing unit 10. The input device 20 includes a keyboard 21, a mouse 22, and a scanner 23. The storage device 30 includes a RAM 31, a ROM 32, a hard disk drive 33, and a flexible disk drive 34. The CPU 10 executes a variety of operation programs stored in the storage device 30 for performing later-described operations, of which the results are stored in the storage device 30, displayed on the display unit 40, and printed out from the printing device 50 by the CPU 10. The storage device 30 stores a variety of libraries in addition to the operation programs.

Figure 6:
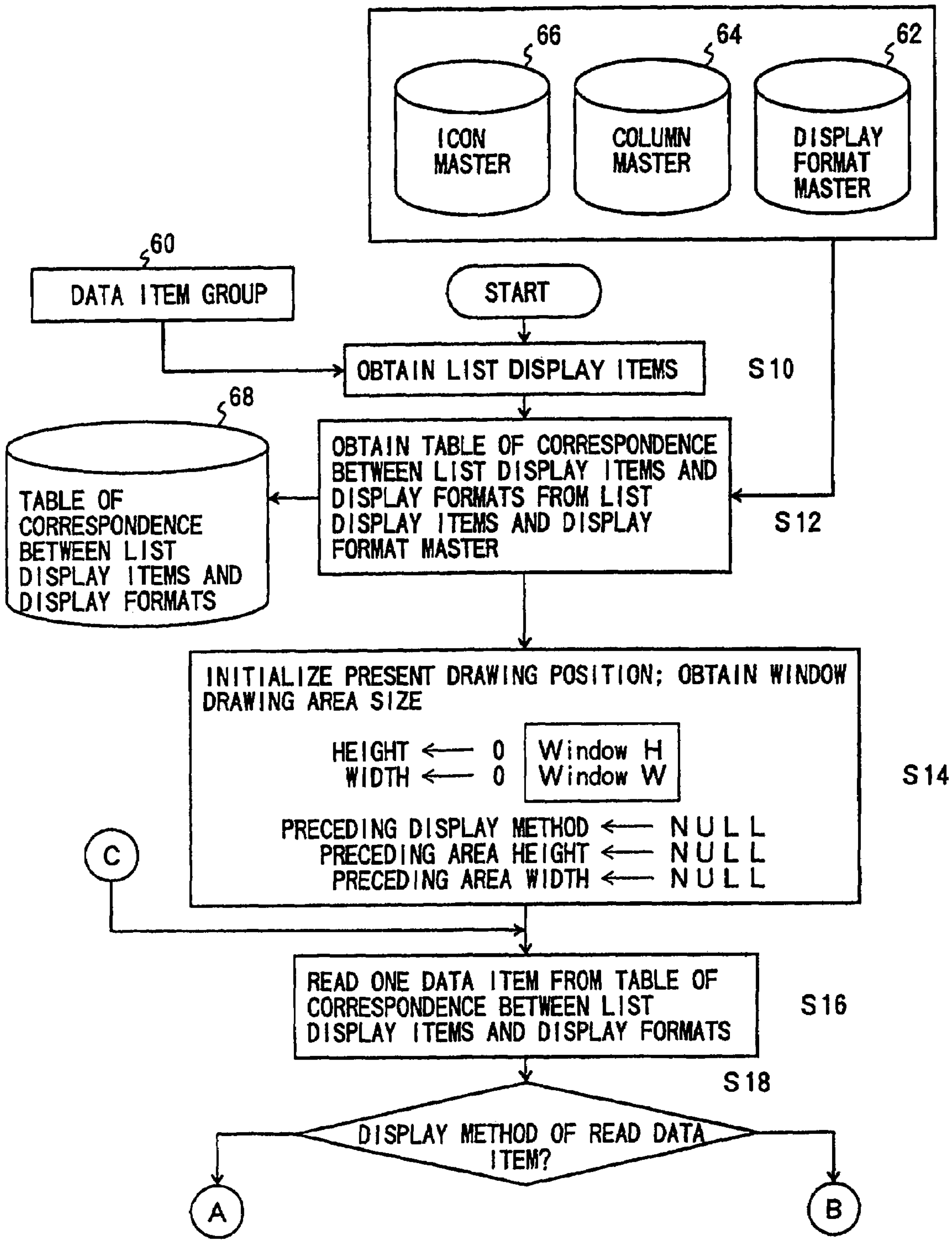
FIG. 6 is a flowchart of an example of a drawing operation performed by the data item list display apparatus of the present invention.
Figure 7:
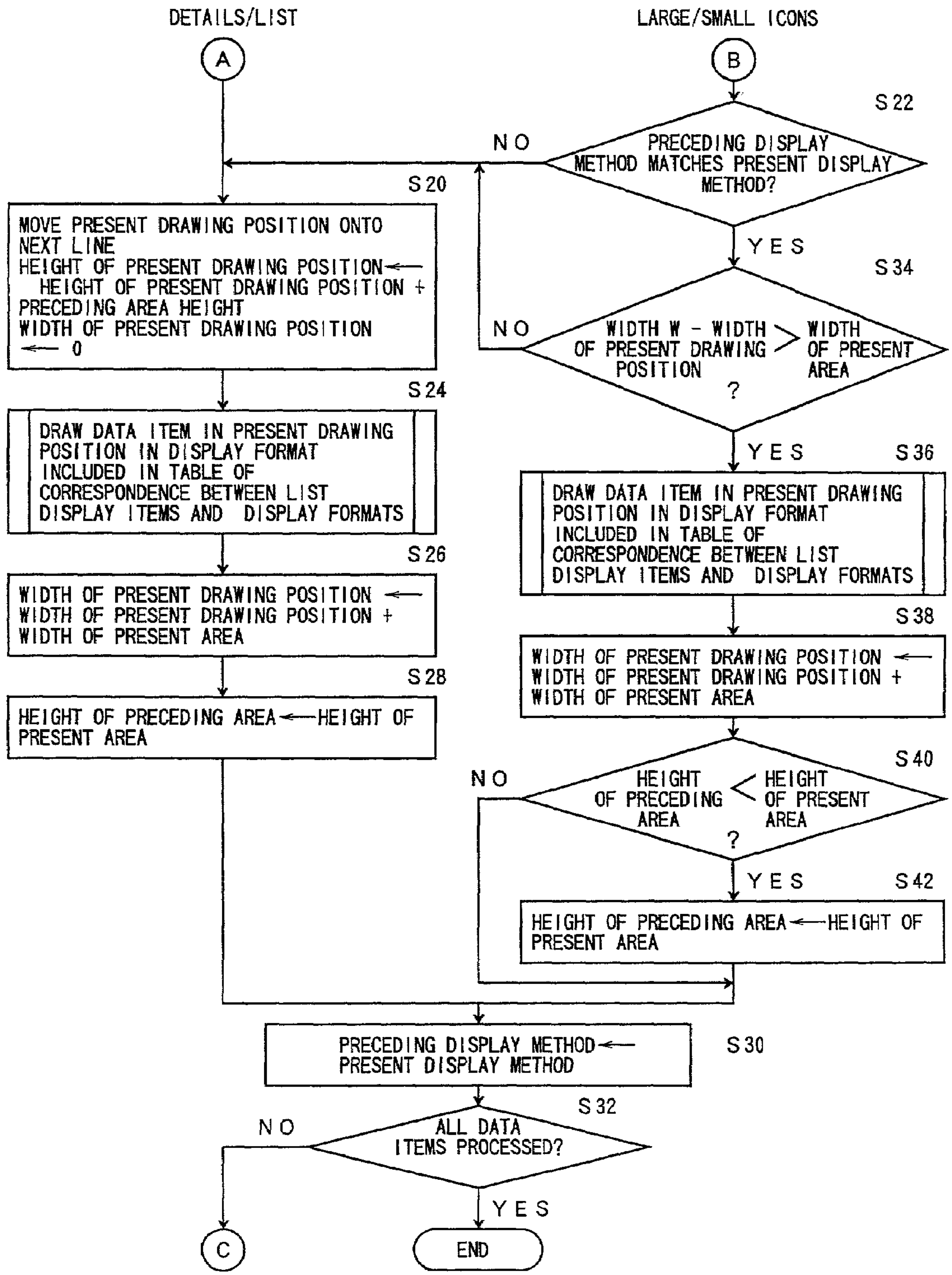
FIG. 7 is a flowchart of an example of a drawing operation performed by the data item list display apparatus of the present invention.

FIGS. 6 and 7 are flowcharts of an example of a drawing operation performed by the data item list display apparatus of the present invention. This operation is initiated, for instance, by a user selecting a folder storing data items of different attributes.

In step 10 of FIG. 6, all data items included in a specified folder are read out from a data item group 60 stored in the hard disk drive 33, and are stored in a work area of the RAM 31 as list display items. FIGS. 8(A) and 8(B) show a first example of the list display items. For convenience of drawing, FIG. 8 is divided into FIGS. 8(A) and 8(B). With respect to the list display items, the attribute of each list display item is stored first, and thereafter, all or a part of the first through fifth items and content item of each list display item are stored depending on the attribute. For instance, if the attribute is MAIL, the title, data and time, sender, sender address, state (read or unread), and initial sentences of a mail are stored in the first through fifth items and content item, respectively. The list display items are arranged in an order entered in the data item group 60, that is, in descending order.

Next, in step S12, the list display items are checked one by one with a display format master 62 so that a table 68 of correspondence between the list display items and display formats is created. The display format master 62, a column master 64, and an icon master 66 are prestored in the hard disk drive 33. As shown in FIG. 9, a display method, an icon number, a column name, a font, a font size, a font color, the presence or absence of content display, display conditions, and a display area size of each data item are stored for each display format name in the display format master 62.

As shown in FIGS. 10(A) and 10(B), an icon number, a heading, and the width of each of first through fifth columns are entered for each column name in the column master 64. FIG. 10 is divided into FIGS. 10(A) and 10(B) for convenience of drawing. As shown in FIG. 11, icon names each indicating an icon design are entered in correspondence to the respective icon numbers.

In step S12, the display format master 62 is referred to by the attribute of each of the list display items, and thereafter, a display format name whose display conditions correspond to the first through fifth items and content item of each data item is obtained. Then, the obtained display format name is added to each of the list display items so that the table 68 of the correspondence between the list display items and the display formats shown in FIGS. 12(A) and 12(B) is created to be stored in the hard disk drive 33.

Next, in step S14, the height and width of a present drawing position are initialized to zero, and a preceding display method, or a method of displaying a preceding data item, and the height and width of a preceding area, or an area for displaying the preceding data item, are initialized to NULL. The height H and width W of the drawing area of a display window are predetermined. Next, in step S16, a data item is read from the table 68 of the correspondence between the list display items and the display formats. Then, in step S18, the method of displaying the data item, or a present display method, is retrieved by referring to the display format master 62 by the display format name of the data item, and it is determined whether the present display method displays data items by using large or small icons, or in details or in a list. If the present display method is determined to display data items in details or in a list, the operation proceeds to step S20, and if the present display method is determined to display data items by using large or small icons, the operation proceeds to step S22.

In step S20 of FIG. 7, the present drawing position is moved onto the next line. Here, the height of the present position is determined by adding the height of the preceding area thereto, and the width of the present drawing position is set to zero. Next, in step S24, the data item read from the correspondence list 68 between the list display items and the display formats is drawn in the present drawing position by the present drawing method by using the column master 64 and the icon master 66.

Next, in step S26, the width of the present drawing position is determined by adding the width of the preceding area thereto. Further, in step S28, the height of a present area, or the height of the display area size of the data item read from the correspondence list 68 between the list display items and the display formats by referring to the display format master 62 by the display format name of the data item, is set in the height of the preceding area, and in step S30, the present display method is set in the preceding display method. Thereafter, in step S32, it is determined whether all the data items read from the table 68 of the correspondence between the list display items and the display formats have been processed. If all have not been processed, the operation goes to step S16, and if all have been processed, this operation ends.

On the other hand, if it is determined in step S18 that the present display method displays data items by using large or small icons, in step S22 of FIG. 7, it is determined whether the present display method matches the preceding display method. If the present display method does not match the preceding method, the operation proceeds to step S20, and if the present display method matches the preceding display method, the operation proceeds to step S34. In step S34, it is determined whether a value obtained by subtracting the width of the present drawing position from the width W of the drawing area of the display window is greater than the width of the present area, or the width of the display area size of the data item read from the correspondence list 68 between the list display items and the display formats by referring to the display format master 62 by the display format name of the data item. If it is determined in step S34 that the obtained value is not greater than the width of the present position, the data item is prevented from being drawn in the line, so that the operation proceeds to step S20 for feeding a line. If it is determined in step S34 that the obtained value is greater than the width of the present position, the data item can be drawn in the line, so that the operation proceeds to step S36.

In step S36, the data item read from the correspondence list 68 between the list display items and the display formats is drawn in the present drawing position by the present drawing method by using the column master 64 and the icon master 66. Next, in step S38, the width of the present drawing position is determined by adding the width of the preceding area thereto.

Further, in step S40, it is determined whether the height of the present area is higher than that of the preceding area, and only if the height of the present area is higher than that of the preceding area, in step S42, the height of the present area is set in that of the preceding area. Thereafter, in step S32, it is determined whether all the data items read from the table 68 of the correspondence between the list display items and the display formats have been processed. If all have not been processed, the operation goes to step S16, and if all have been processed, this operation ends.

Figure 13:
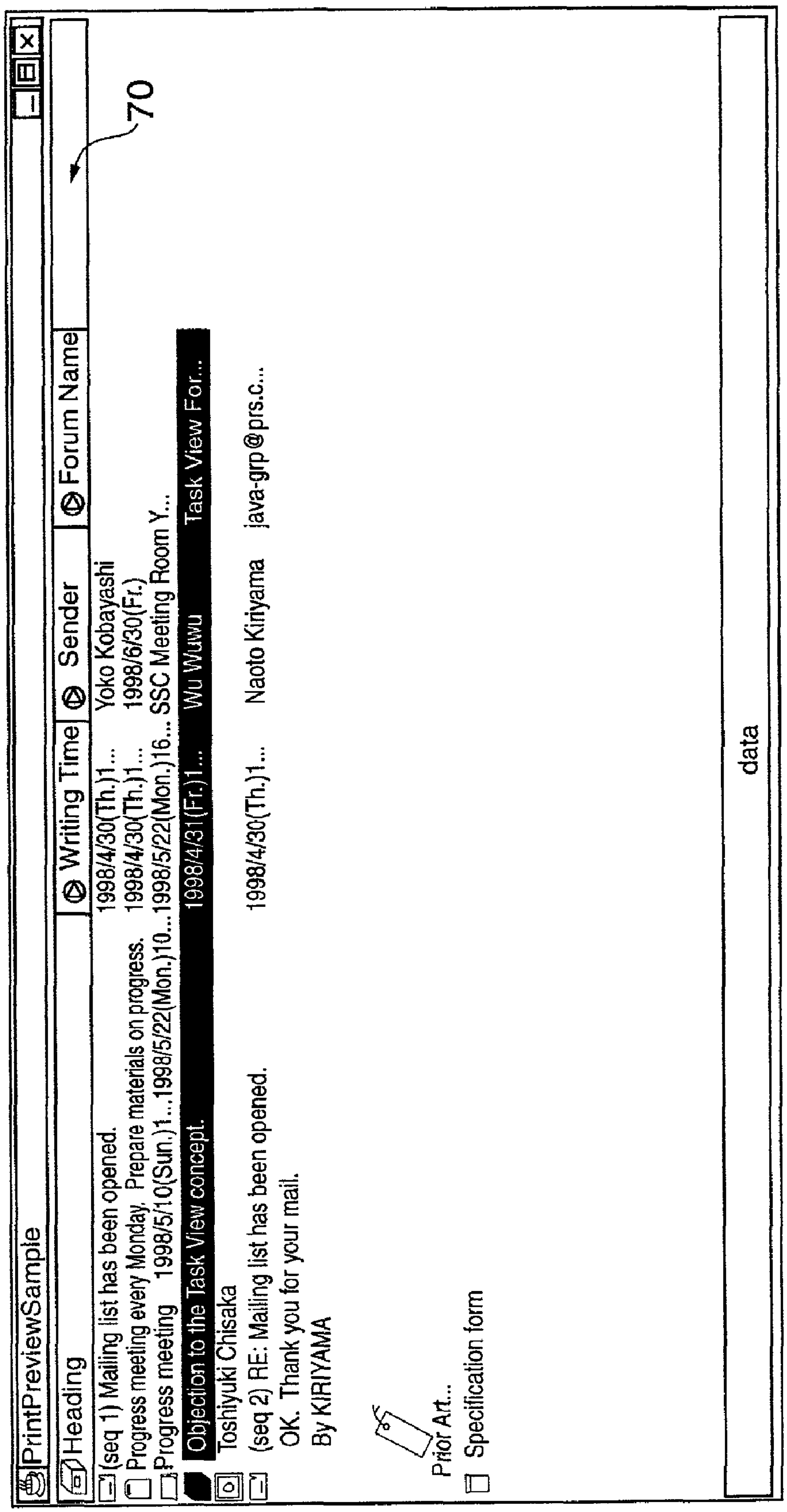
FIG. 13 is a diagram showing a first example of the drawn table 68 of correspondence between the list display items and the display formats of FIG. 12.

FIG. 13 is a diagram showing a first example of the drawn table 68 of the correspondence between the list display items and the display formats. Here, the display method, or a form of display, uses a detailed format for first through sixth data items, a large icon format for a seventh data item, and a list format for an eighth data item. Further, although the attributes of both first and sixth data items are MAIL, the first data item has been read while the sixth data item has been unread, as shown in FIG. 12. Therefore, based on the display format master 62 of FIG. 9, the read first data item is displayed in the detailed format in MAIL FORMAT 1 with content display, and the unread sixth data item is displayed in the detailed format in MAIL FORMAT 2 with a content display.

Next, a description will be given, with reference to FIGS. 29 through 34, of a second example of the drawing operation. FIGS. 29, 30, and 33 are divided into FIGS. 29(A) and 29(B), 30(A) and 30(B), and 33(A) and 33(B), respectively, for convenience of drawing. FIGS. 29(A) and 29(B) show a second example of the list display items. With respect to the list display items, the attribute of each list display item is stored first, and thereafter, all or a part of the first through fifth items and content item of each list display item are stored depending on the attribute.

FIGS. 30(A) and 30(B) show a second example of the display format master 62. In the display format master 62 of FIG. 9, the same font size is provided for the display format names. However, in the display format master of FIG. 30, the font size is set to "11", "16", and "22" with respect to the majority of the display format names, the display format name "MAIL FORMAT 2", and a display format name "FORUM FORMAT 2", respectively, and the height and width of "the display area size of each data item" are determined based on the font size. Further, the fonts "Times New Roman" and "Courier New" are specified for display format names "CALENDAR FORMAT" and "ADDRESS FORMAT", respectively.

In a second example of the column master 64 shown in FIG. 31, an icon number, a heading, and the width of each of first through fifth columns are entered for each column name. In a second example of the icon master 66 shown in FIG. 32, icon names each indicating an icon design are entered in correspondence to the icon numbers.

The display format master 62 of FIG. 30 is referred to by the attribute of each of the list display items of FIG. 29, and thereafter, a display format name whose display conditions correspond to the first through fifth items and content item of each data item is obtained. Then, the obtained display format name is added to each of the list display items so that the table 68 of the correspondence between the list display items and the display formats shown in FIGS. 33(A) and 33(B) is created.

Figure 34:
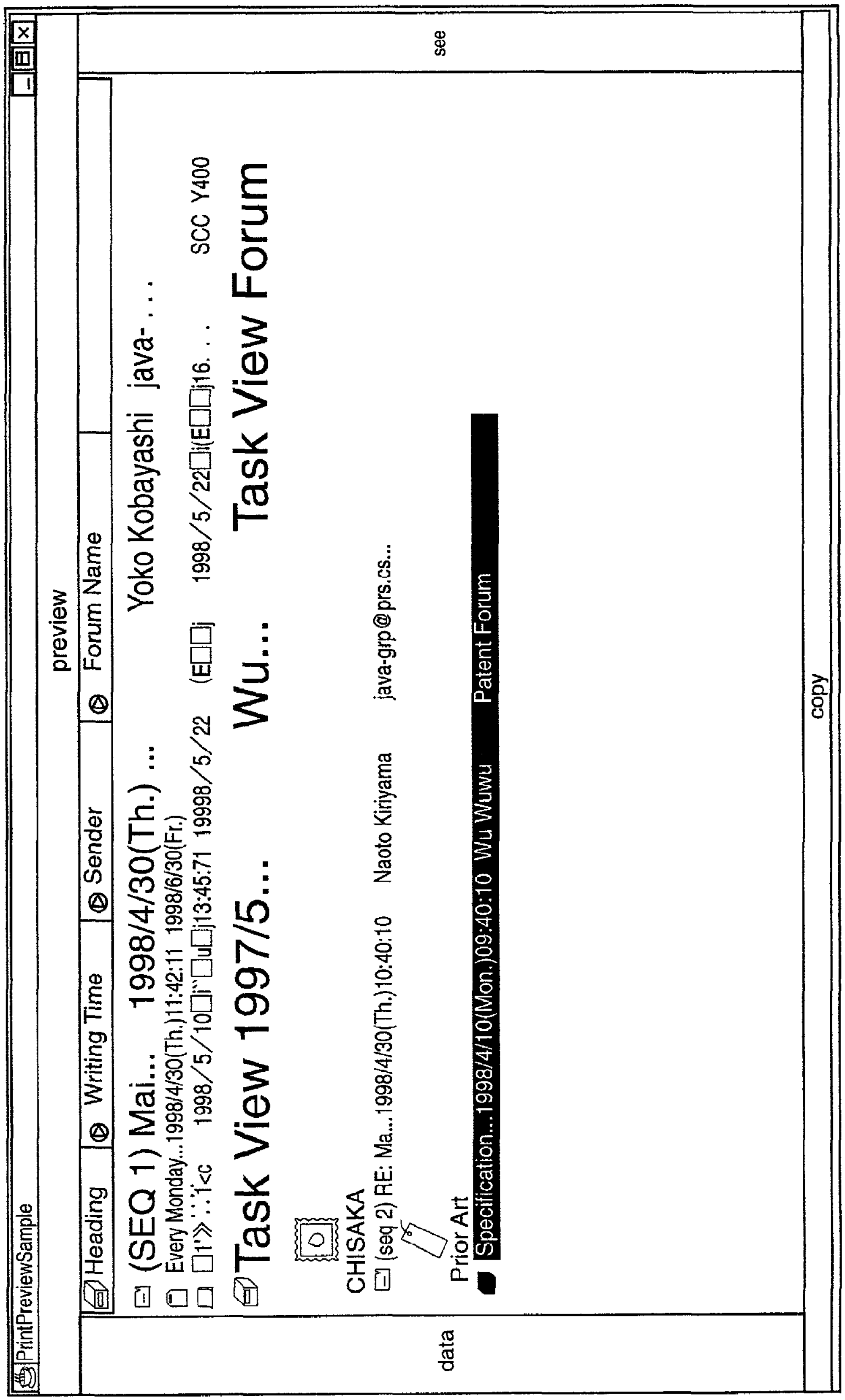
FIG. 34 is a diagram showing a second example of the drawn table 68 of the correspondence between the list display items and the display formats of FIG. 33.

FIG. 34 is a second example of the drawn table 68 of the correspondence between the list display items of FIG. 33 and the display formats. Here, the display method (display form) uses the detailed format for first through third data items, the list format for a fourth data item, a small icon format for a fifth data item, the detailed format for a sixth data item, the large icon format for a seventh data item, and the detailed format for an eighth data item.

Further, although the attributes of both first and sixth data items are MAIL, the first data item has been read while the sixth data item has been unread, as shown in FIG. 33. Therefore, based on the display format master 62 of FIG. 30, the read first data item is displayed with the font size of 16 in MAIL FORMAT 1 with no content display, and the unread sixth data item is displayed with the font size of 11 in MAIL FORMAT 2 with content display.

Further, since the fourth data item is provided with FORUM FORMAT 1, the fourth data item is displayed with the font size of 22 in Gothic typeface based on the display format master 62 of FIG. 30, and since the eighth data item is provided with FORUM FORMAT 2, the eighth data item is displayed with the font size of 11 in Gothic typeface based on the display format master 62.

Thus, a plurality of data items are displayed in a list in different display forms based on the respective attributes. Therefore, the same display format can be used to display a data item in a list of data items of different attributes and in a list of data items of a single attribute. This allows users to understand the lists more easily without confusion. Further, all the desired information to be displayed of each data item can be displayed without fail, thus making it easy to find objective data from a list.

The data item list display apparatus of the present invention includes the display format master 62 as a table of correspondence that has the display forms corresponding to the attributes, the column master 64, and the icon master 66, and determines the display form of each of data items displayed in a list by referring to the display format master 62, the column master 64, and the icon master 66 by the attribute of each of the data items. Therefore, a display form for the attribute of each data item can be easily changed by updating the display format master 62, the column master 64, and the icon master 66.

The display format master 62, the column master 64, and the icon master 66 have the display forms corresponding to predetermined conditions so that the display form of each of data items displayed in a list is determined by referring to the display format master 62, the column master 64, and the icon master 66 by the attribute and contents of each of the data items. Therefore, even if data items are of the same attribute, the data items are displayed in different display forms depending on whether the data items satisfy predetermined conditions, thus making it easy for the users to understand whether the data items satisfy the predetermined conditions. Further, since data items are displayed by adding thereto icons of different sizes based on their display forms, each of the data items can be displayed with an icon of an appropriate size for its display format. Therefore, a data item can be displayed with the same icon in a list of data items of different attributes and in a list of data items of a single attribute. Furthermore, since data items are displayed in different types of fonts depending on their display forms, each of the data items can be displayed in a suitable type of font for its display format. Therefore, a data item can be displayed in the same font type in a list of data items of different attributes and in a list of data items of a single attribute.

Moreover, since each of data items of different display forms is aligned to be displayed, the icons of the data items can be arranged to be displayed in order. Further, since an area where data items have been displayed and an area required to display data items are managed, the icons of the data items can be arranged to be displayed in order.

Figure 14:
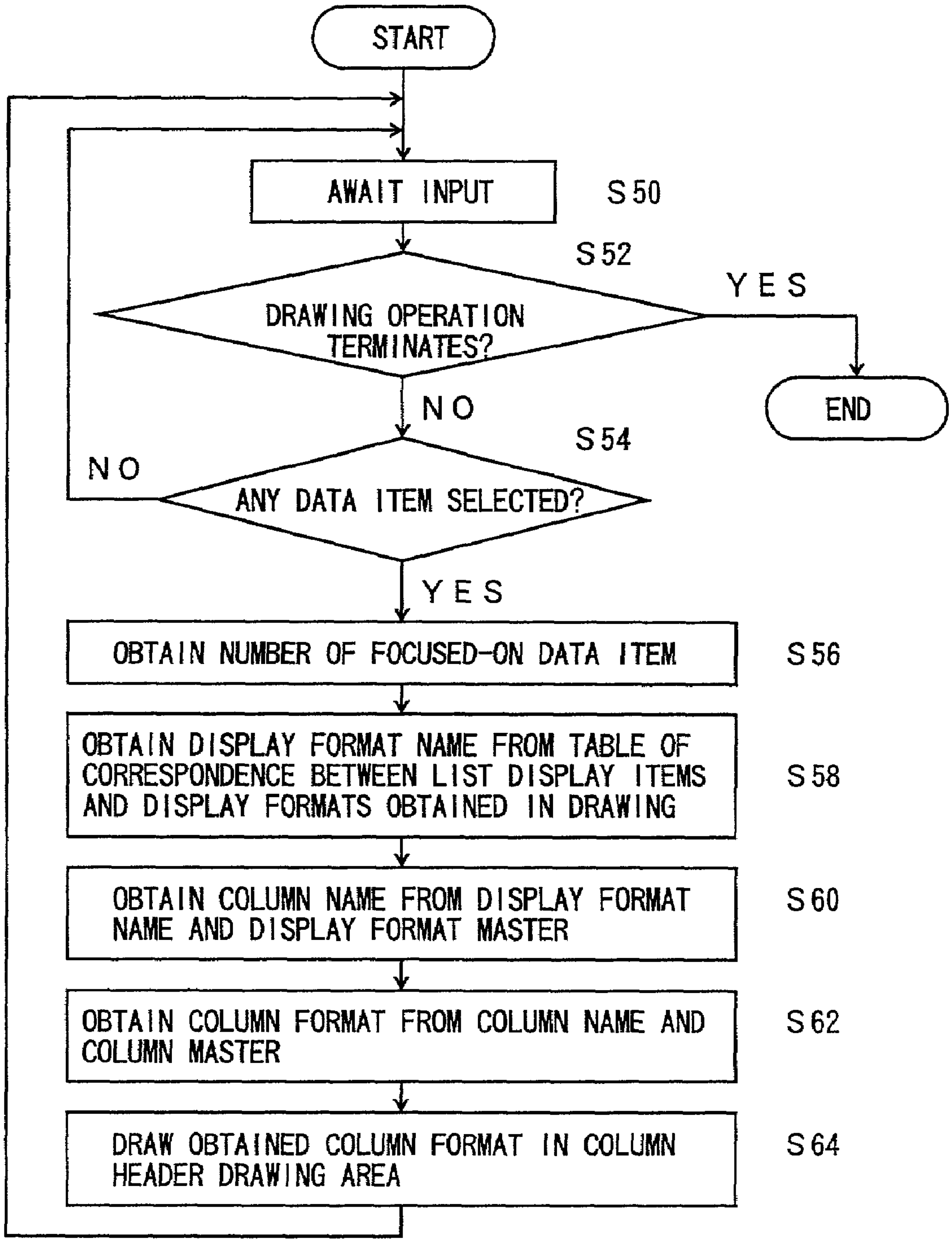
FIG. 14 is a flowchart of a column header switching operation performed by the data item list display apparatus of the present invention.

FIG. 14 is a flowchart of a column header switching operation performed by the data item list display apparatus of the present invention. This operation is performed following the drawing operation. In the drawing, in step S50, an input is awaited. In step S52, it is determined whether the drawing operation is canceled to terminate. In step S54, it is determined whether any one of data items is selected. The selected data item is displayed by turn over indication. In the example of FIG. 13, the fourth data item is selected.

After the data item is selected, the operation proceeds to step S56 where the focused-on data item, or the data item displayed by turn over indication, is obtained. Then, in step S58, a display format name corresponding to this data item is obtained by referring to the table 68 of the correspondence between the list display items and the display formats. Next, in step S60, a column name is obtained by referring to the display format master 62 by the obtained display format name, and in step S62, the column format, or the contents of the first through fifth columns, of the obtained column name is obtained by referring to the column master 64 by the obtained column name. Then, in step S64, the column format, or the contents of the first through fifth columns, is drawn in a column header drawing area 70, which is the second line from top in FIG. 13. Thereafter, the operation proceeds to step S50.

Figure 15:
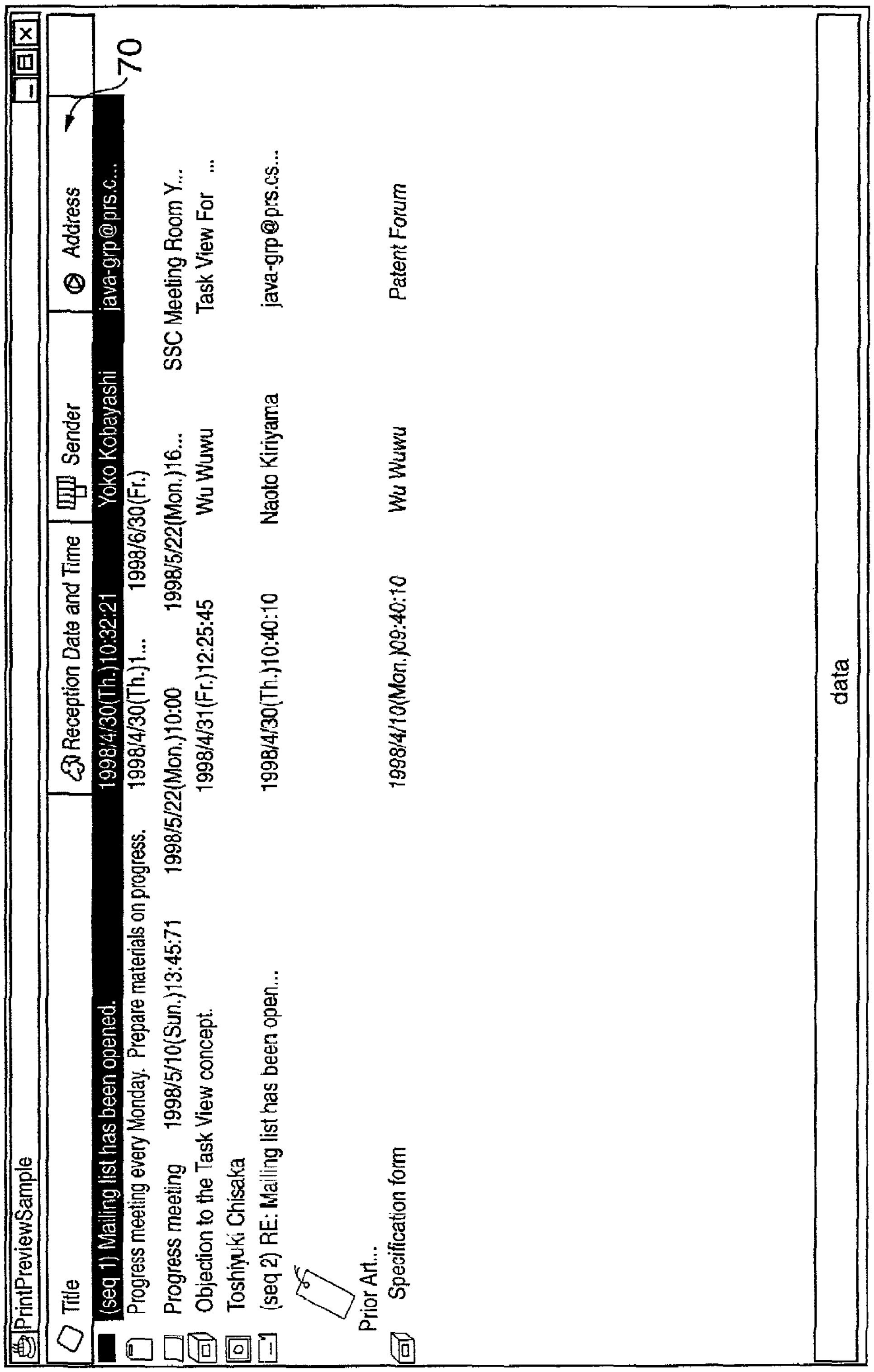
FIG. 15 is a diagram showing a displayed column header drawing area 70 in a case where a data item of a MAIL attribute is selected.
Figure 16:
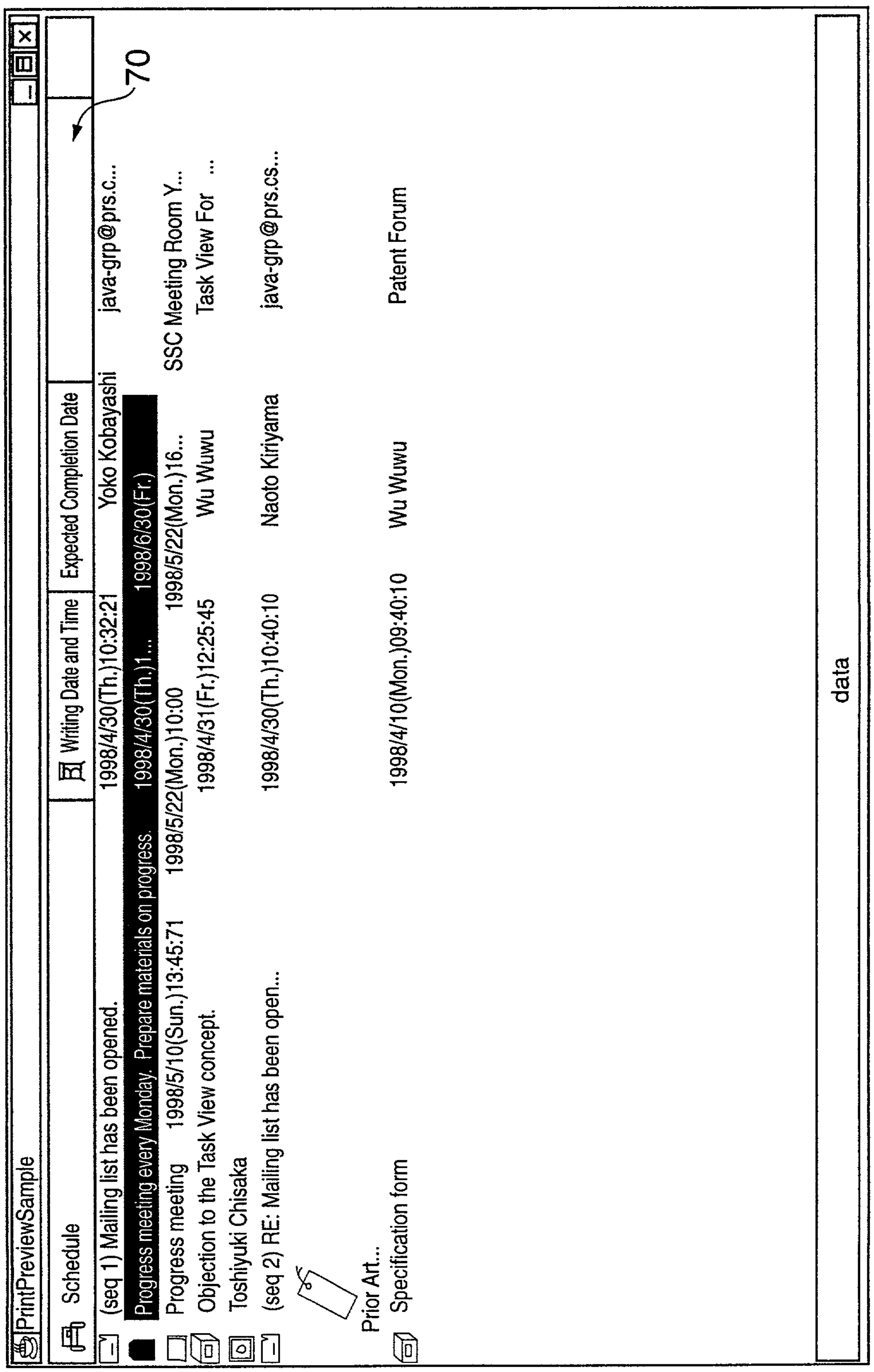
FIG. 16 is a diagram showing the displayed column header drawing area 70 in a case where a data item of a TO DO (SCHEDULE) attribute is selected.
Figure 17:
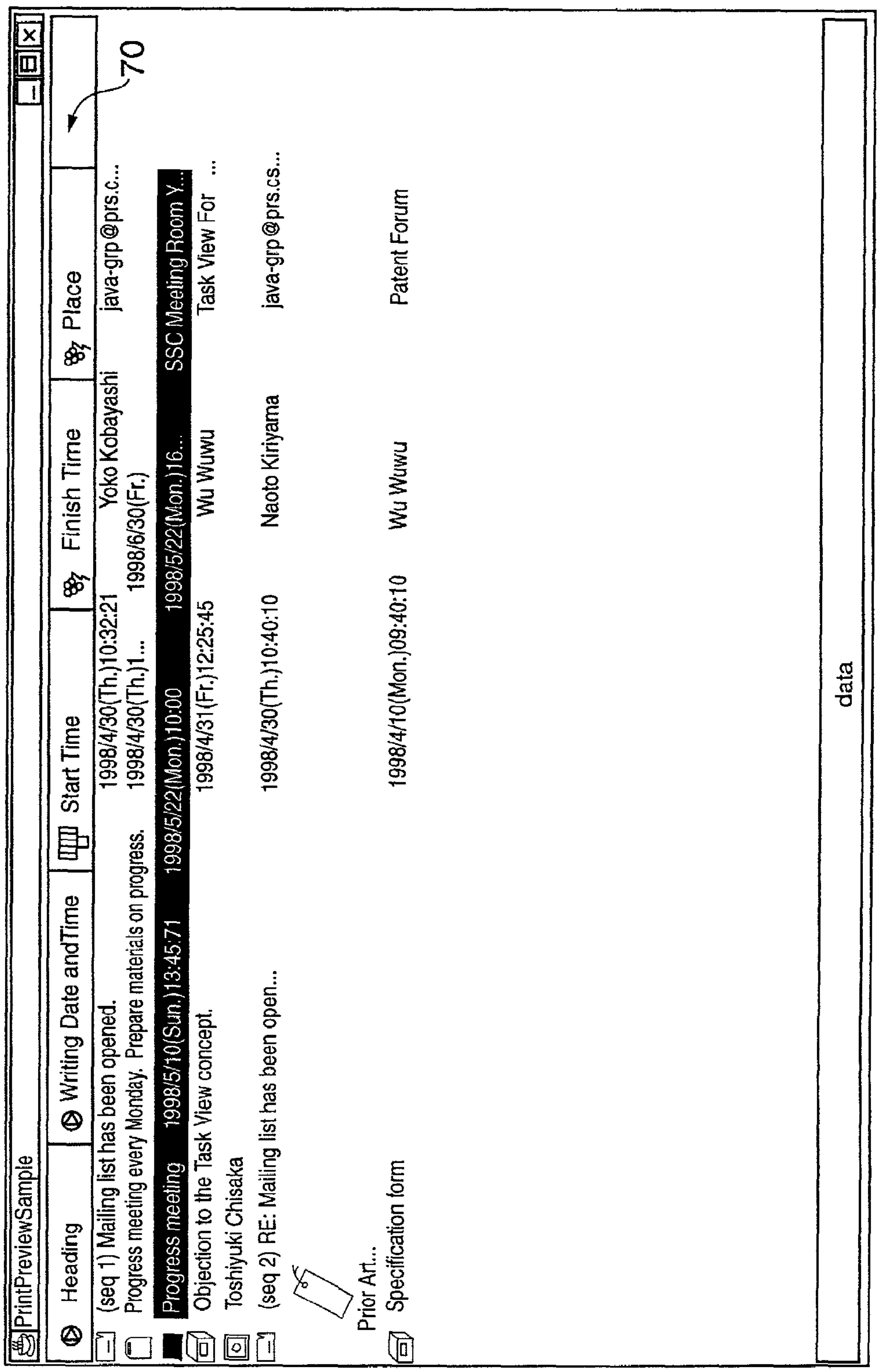
FIG. 17 is a diagram showing the displayed column header drawing area 70 in a case where a data item of a CALENDAR attribute is selected.
Figure 18:
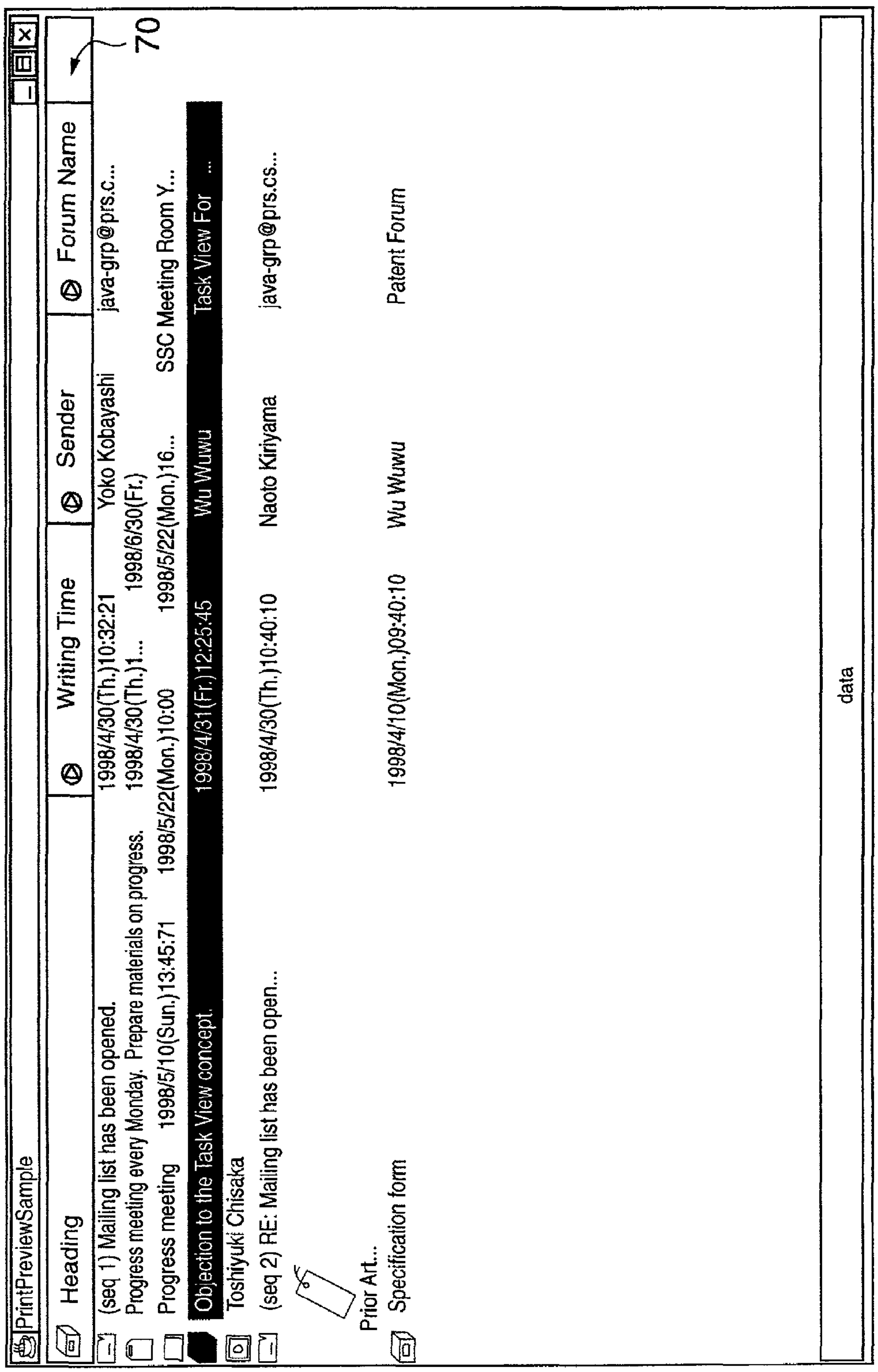
FIG. 18 is a diagram showing the displayed column header drawing area 70 in a case where a data item of a FORUM attribute is selected.
Figure 19:
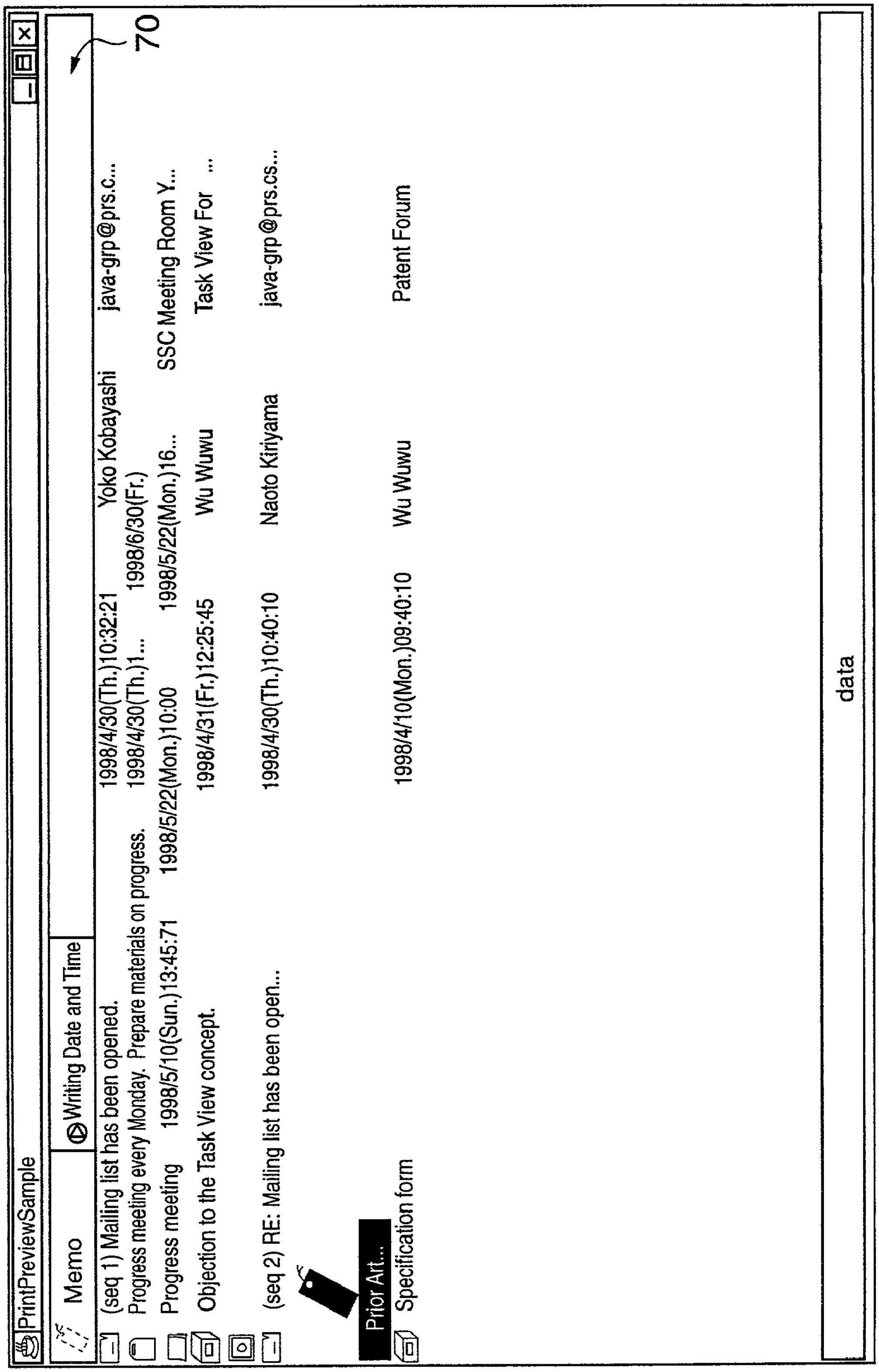
FIG. 19 is a diagram showing the displayed column header drawing area 70 in a case where a data item of a MEMO attribute is selected.
Figure 20:
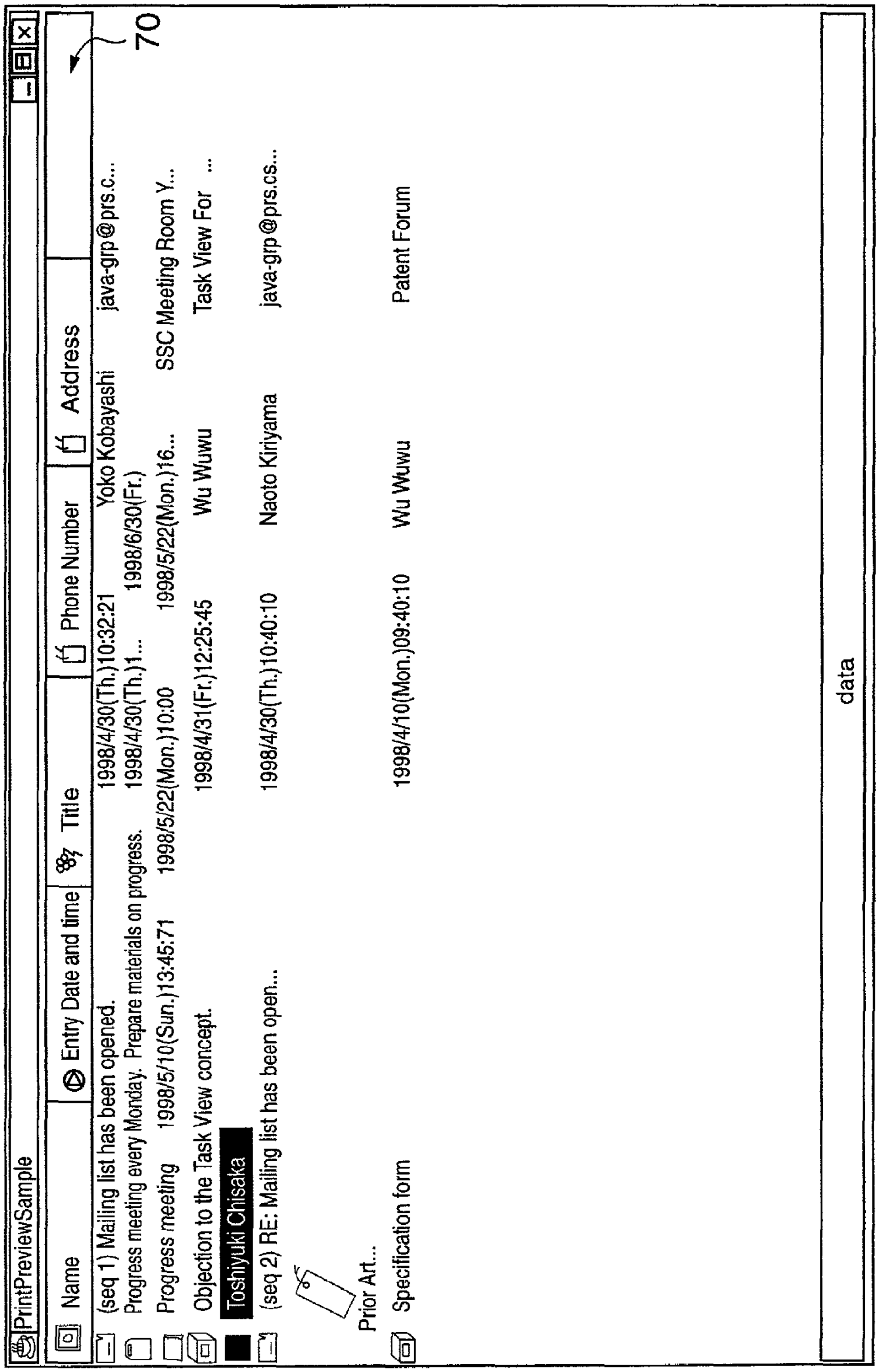
FIG. 20 is a diagram showing the displayed column header drawing area 70 in a case where a data item of an ADDRESS attribute is selected.

Here, FIG. 15 shows the displayed column header drawing area 70 in a case where a data item of the MAIL attribute is selected. FIG. 16 shows the displayed column header drawing area 70 in a case where a data item of the TO DO (SCHEDULE) attribute is selected. FIG. 17 shows the displayed column header drawing area 70 in a case where a data item of the CALENDAR attribute is selected. FIG. 18 shows the displayed column header drawing area 70 in a case where a data item of the FORUM attribute is selected. FIG. 19 shows the displayed column header drawing area 70 in a case where a data item of the MEMO attribute is selected. FIG. 20 shows the displayed column header drawing area 70 in a case where a data item of the ADDRESS attribute is selected.

Thus, a column header corresponding to the display format of a selected one of data items displayed in a list is displayed, thus allowing the users to easily understand the displayed contents of the selected data item.

Figure 21:
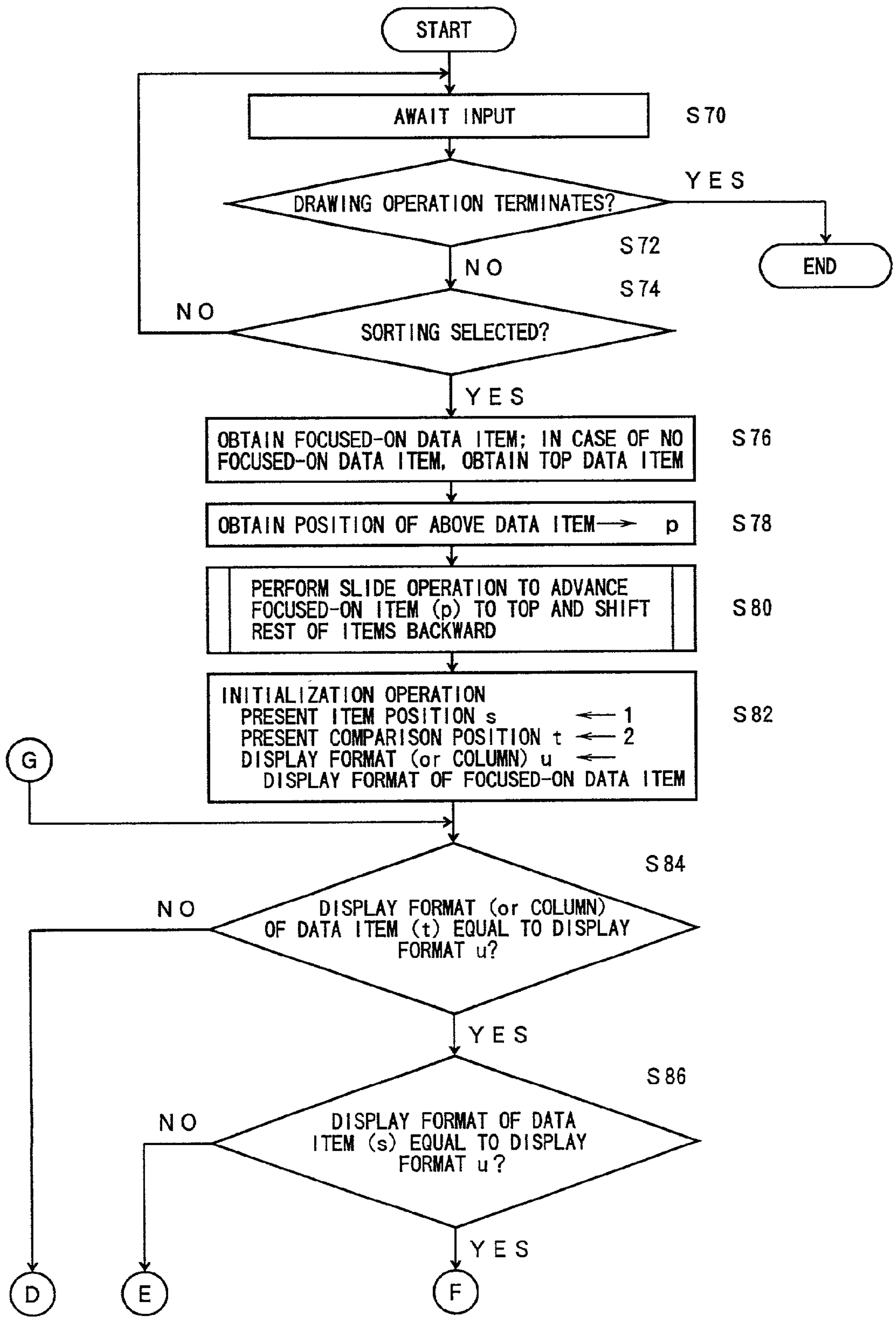
FIG. 21 is a flowchart of a sorting operation performed by the data item list display apparatus of the present invention.
Figure 22:
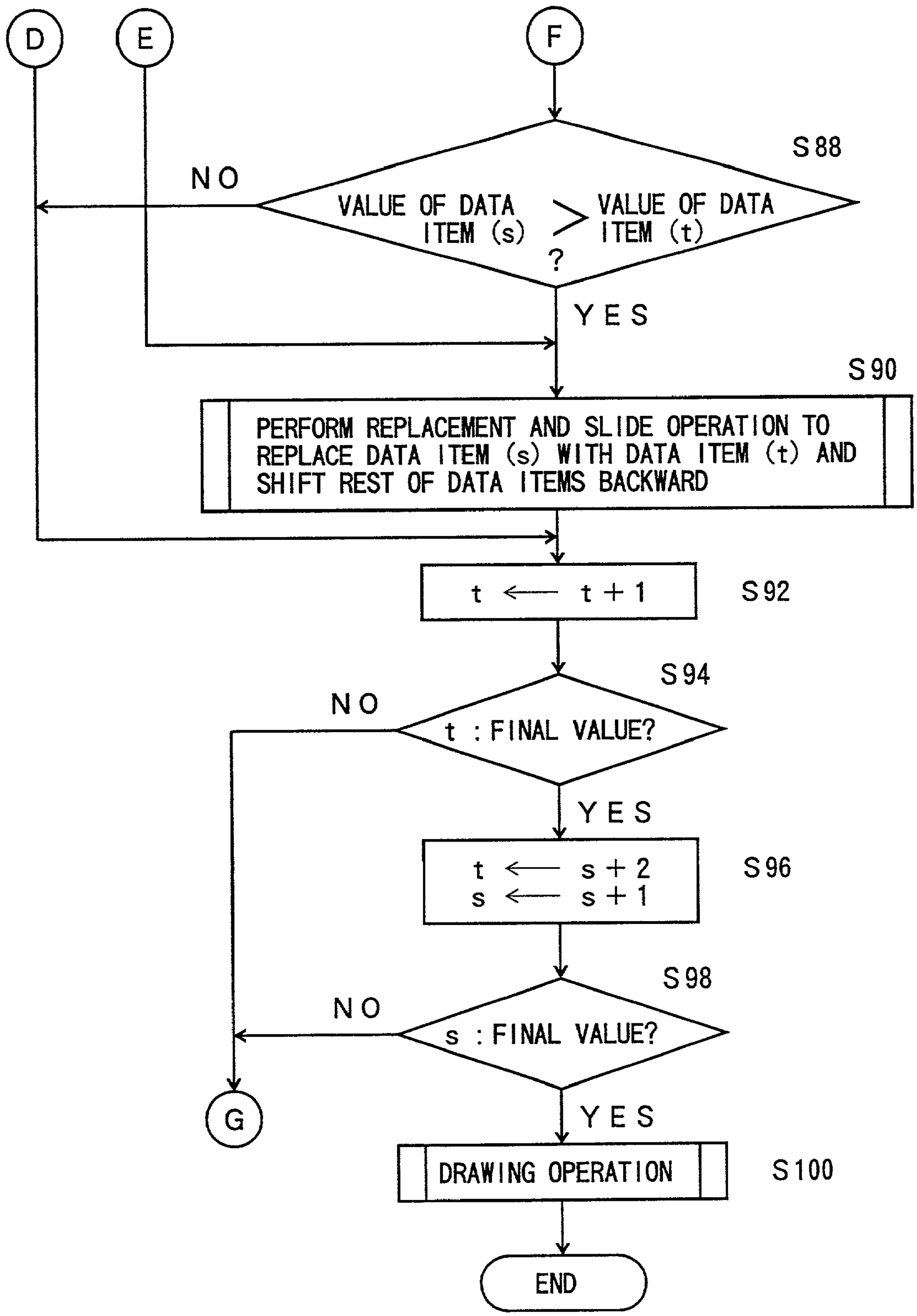
FIG. 22 is a flowchart of a sorting operation performed by the data item list display apparatus of the present invention.

FIGS. 21 and 22 are flowcharts of a sorting operation performed by the data item list display apparatus of the present invention. This operation is performed following the drawing operation. In step 70 of FIG. 21, an input is awaited. In step S72, it is determined whether the drawing operation is canceled to terminate. Then, in step S74, it is determined whether sorting is selected by clicking the column header drawing area 70. If sorting is selected, the operation proceeds to step S76 where a focused-on data item is obtained. If there is no focused-on data item, a top, or first, data item is obtained.

Then, in step S78, a number indicating the display order of the focused-on data item is obtained to be stored in a variable P. Next, in step S80, the display order of the focused-on data item is advanced to the top, or the first, and a slide operation is performed to shift the subsequent data items until the number of the variable P. Further, in step S82, an initialization operation is performed. Here, a present item position s is set to 1, and a present comparison position t is set to 2. Further, the display format of the focused-on data item is set in a display format, or a column, u.

Next, in step S84, it is determined whether the display format of a data item indicated by the present comparison position t is equal to the display format (column) u. If the display formats are different, the operation proceeds to step S92 of FIG. 22, and if the display formats are equal, in step S86, it is determined whether the display format of a data item indicated by the present item position s is equal to the display format (column) u. If the display formats are different, the operation proceeds to step S90 of FIG. 22, and if the display formats are equal, the operation proceeds to step S88.

In step S88, it is determined whether the value of the data item indicated by the present comparison position t is smaller than that of the data item indicated by the present item position s. If the value of the data item indicated by the present comparison position t is smaller than that of the data item indicated by the present item position s, the operation proceeds to step S90 where a replacement and slide operation is performed to replace the data item indicated by the present item position s with the data item indicated by the present comparison position t and to shift the rest of data items backward. Here, the value of a data item refers to the value of the character or numeric character string of the first item of the data item. However, the value of a data item is not limited to this, but may be the value of the character or numeric character string of a specified item of the data item.

If the value of the data item indicated by the present comparison position t is greater than or equal to that of the data item indicated by the present item position s, the operation proceeds to step S92. In step S92, the value of the present comparison position t is incremented by one, and in step S94, it is determined whether the value of the present comparison position t is the final one, that is, it is determined whether the value of the present comparison position t is equal to the number of the data items in the table 68 of the correspondence between the list display items and the display formats. If the value of the present comparison position t is the final one, in step S96, the present comparison position t is set to a value obtained by adding two to the present item position s and the present item position s is incremented by one. Thereafter, in step S98, it is determined whether the value of the present item position s is the final one, that is, it is determined whether the value of the present item position s is equal to the number of the data items in the table 68 of the correspondence between the list display items and the display formats. If the value of the present item position s is the final one, in step S100, the drawing operation of FIGS. 6 and 7 are performed to perform redrawing after sorting and the operation ends. If the values of the present comparison and item positions t and s are not the final ones in steps S94 and S98, respectively, the operation goes to step S84 to continue sorting.

Figure 23:
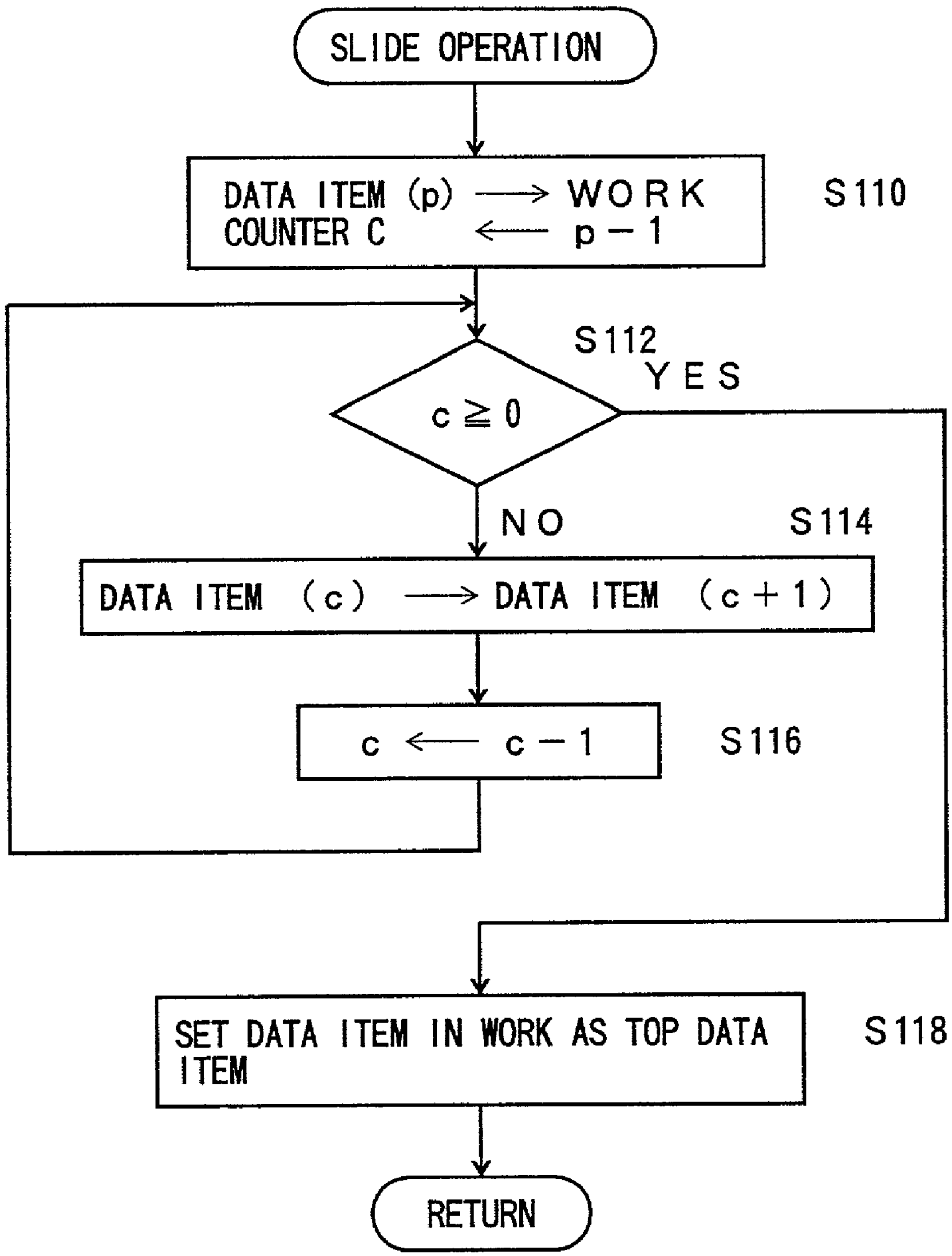
FIG. 23 is a flowchart of an example of a slide operation.

FIG. 23 is a flowchart of an example of the slide operation performed in step S80. In step S110 of the drawing, a data item indicated by the variable P is set in an area WORK, and a value obtained by subtracting one from the variable P is set in a counter C. Next, if the value of the counter C is greater than or equal to zero in step S112, the operation proceeds to step S114 where a data item indicated by the value of the counter C is shifted backward by one by setting the data item indicated by the value of the counter C as a data item indicated by a value obtained by adding one to the value of the counter C.

Thereafter, in step S116, the counter C is decremented by one, and the operation goes to step S112. If the value of the counter C becomes zero, the operation goes from step S112 to step S118 where the data item set in the area WORK is set as the top data item, and then, this routine ends.

Figure 24:
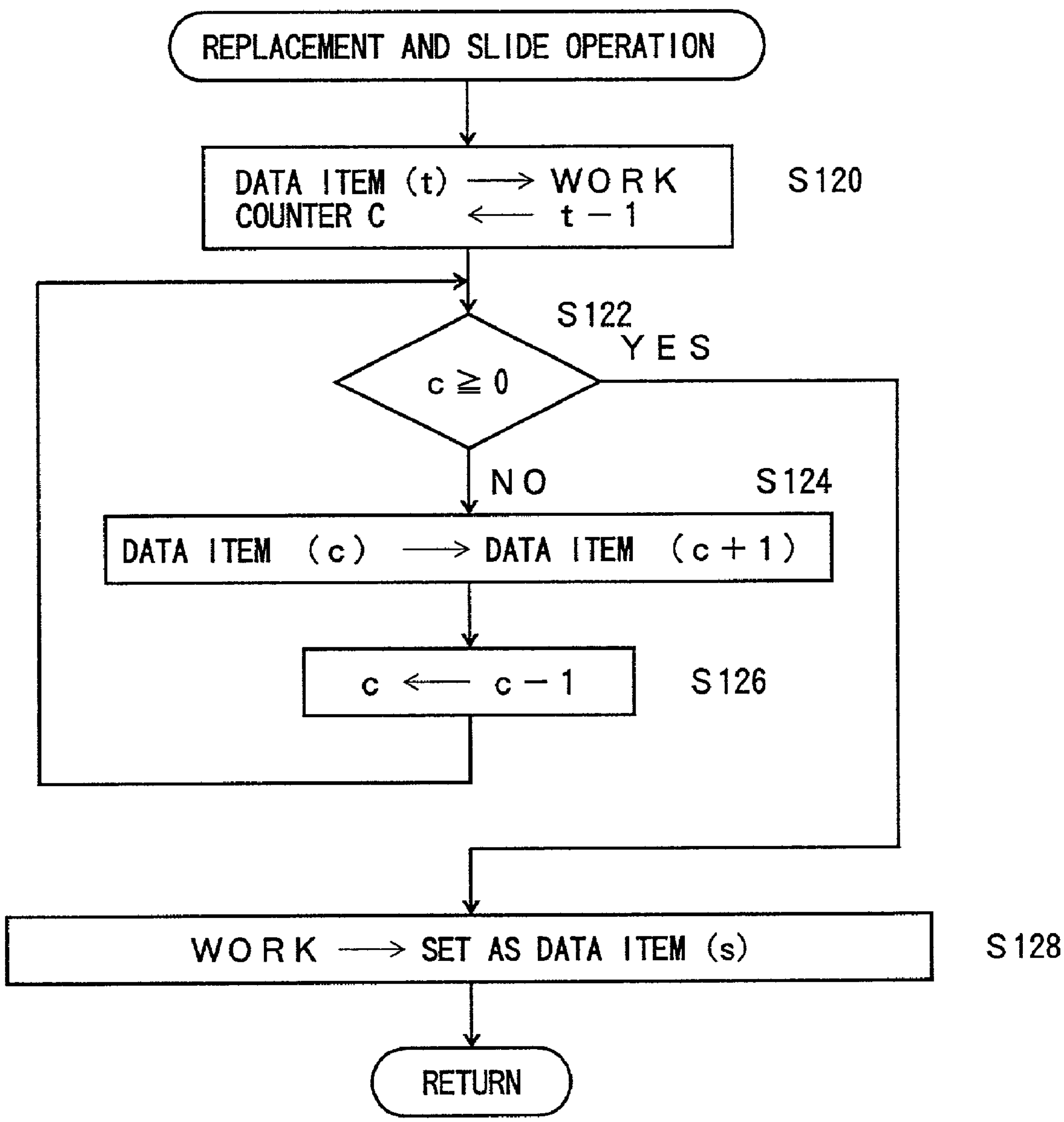
FIG. 24 is a flowchart of an example of a replacement and slide operation.

FIG. 24 is a flowchart of an example of the replacement and slide operation performed in step S90. In step S120 of the drawing, a data item indicated by the present comparison position t is set in the area WORK, and a value obtained by subtracting one from the present comparison position t is set in the counter C. Next, if the value of the counter C is greater than or equal to zero in step S122, the operation proceeds to step S124 where a data item indicated by the value of the counter C is shifted backward by one by setting the data item indicated by the value of the counter C as a data item indicated by a value obtained by adding one to the value of the counter C.

Thereafter, in step S126, the counter C is decremented by one, and the operation goes to step S122. If the value of the counter C becomes zero, the operation goes from step S122 to step S128 where the data item set in the area WORK is set as a data item indicated by the present item position s, and then, this routine ends.

A description will be given of the above-described sorting. As shown in FIG. 25(A), there are eight data items arranged in ascending display order from left to right. The display formats of the data items are indicated by A through C, and the values of the character or numeric character strings of the first items of the data items are indicated by the numbers 1 through 8. In FIG. 25(A), a fourth data item is focused on.

If sorting is initiated in this state, the slide operation is performed to advance the fourth data item to the top and shift the subsequent data items, that is, first through third data items, until the third becomes the fourth, so that a state shown in FIG. 25(B) is entered. Thereafter, in FIG. 25(B), a seventh data item is compared with the second and third data items without rearrangement, and when the present item position s is set to 3 and the present comparison position t is set to 7, the replacement and slide operation is performed so that the data items are rearranged to be in a state shown in FIG. 25(C).

Although an eighth data item is compared with the first through third data items in FIG. 25(C), the data items are not rearranged as shown in FIG. 25(D). Thereafter, when the present item position s is set to 4 and the present comparison position t is set to 8, the replacement and slide operation is performed so that the data items are rearranged to be in a state shown in FIG. 25(E).

Figure 26:
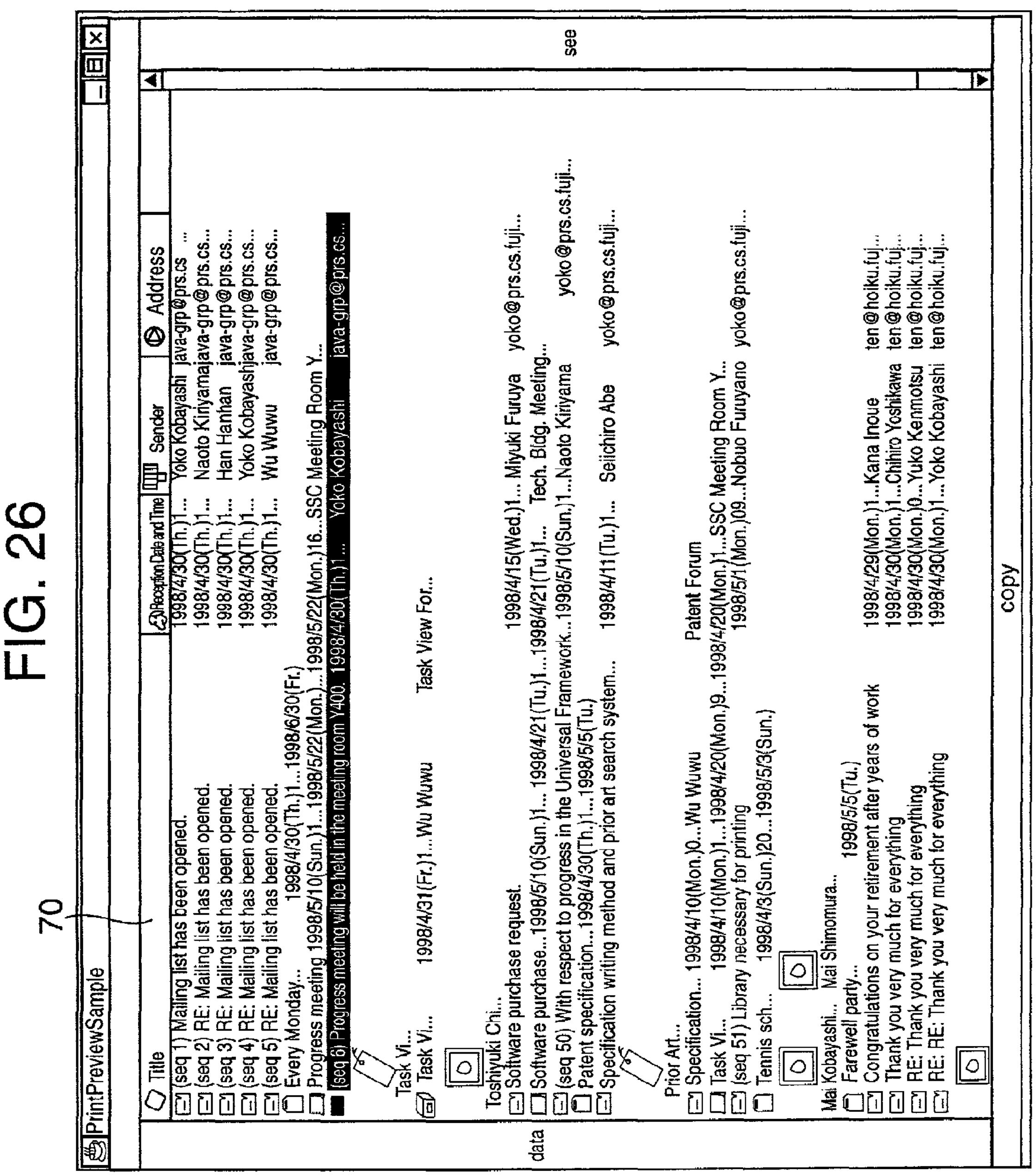
FIG. 26 is a diagram showing a display state before sorting.
Figure 27:
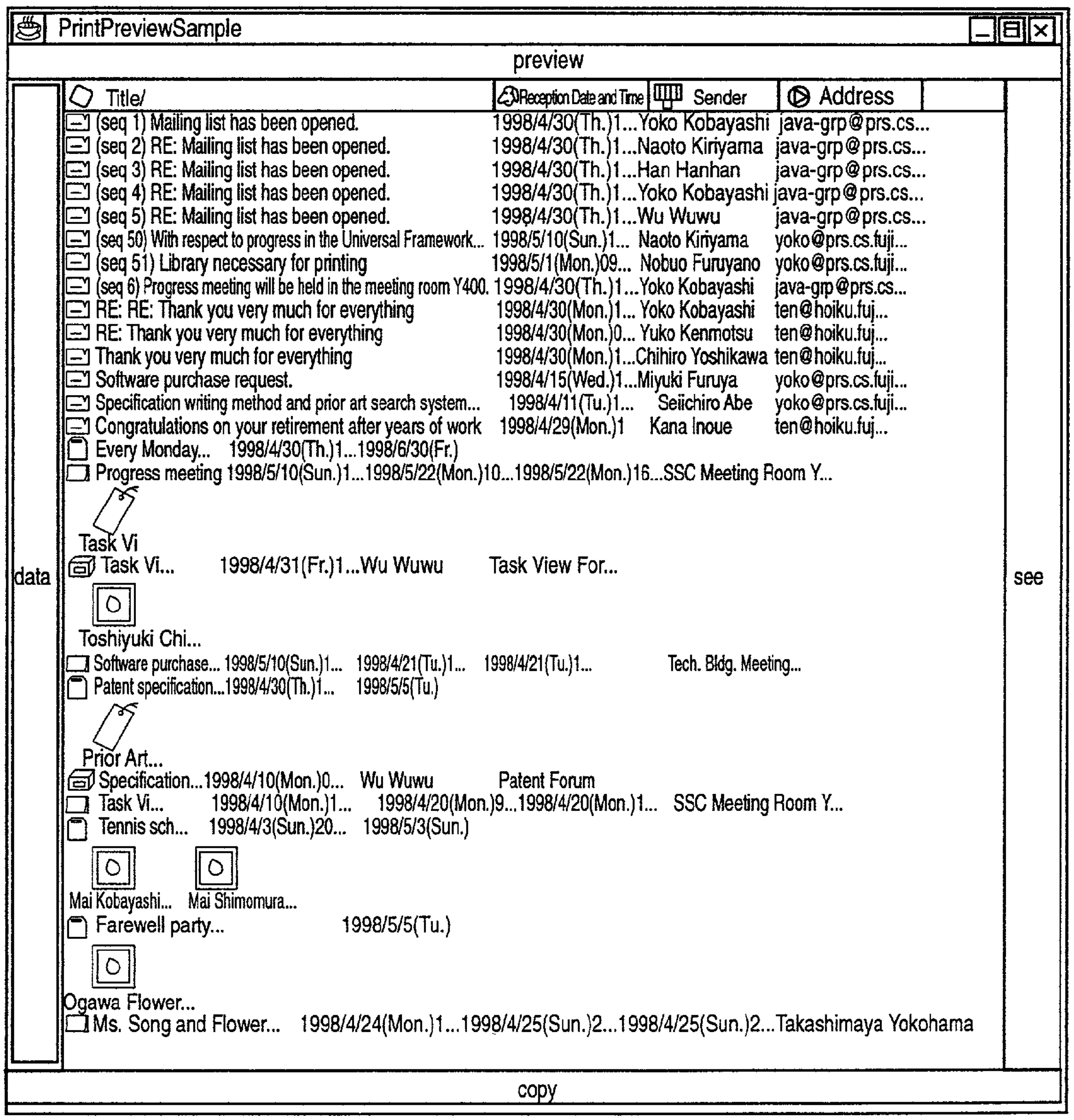
FIG. 27 is a diagram showing a display state after sorting.

If sorting is executed by clicking the column header drawing area 70 in a display state shown in FIG. 26 where the eighth data item is focused on, sorting is sequentially performed as described by referring to FIG. 25 so that a display state shown in FIG. 27 is finally obtained. That is, the data items of the same attributes are grouped and are rearranged in a character string value order, or in ascending order. Therefore, the data items are displayed in such a state that the users can visually recognize the data items with ease.

Figure 28:
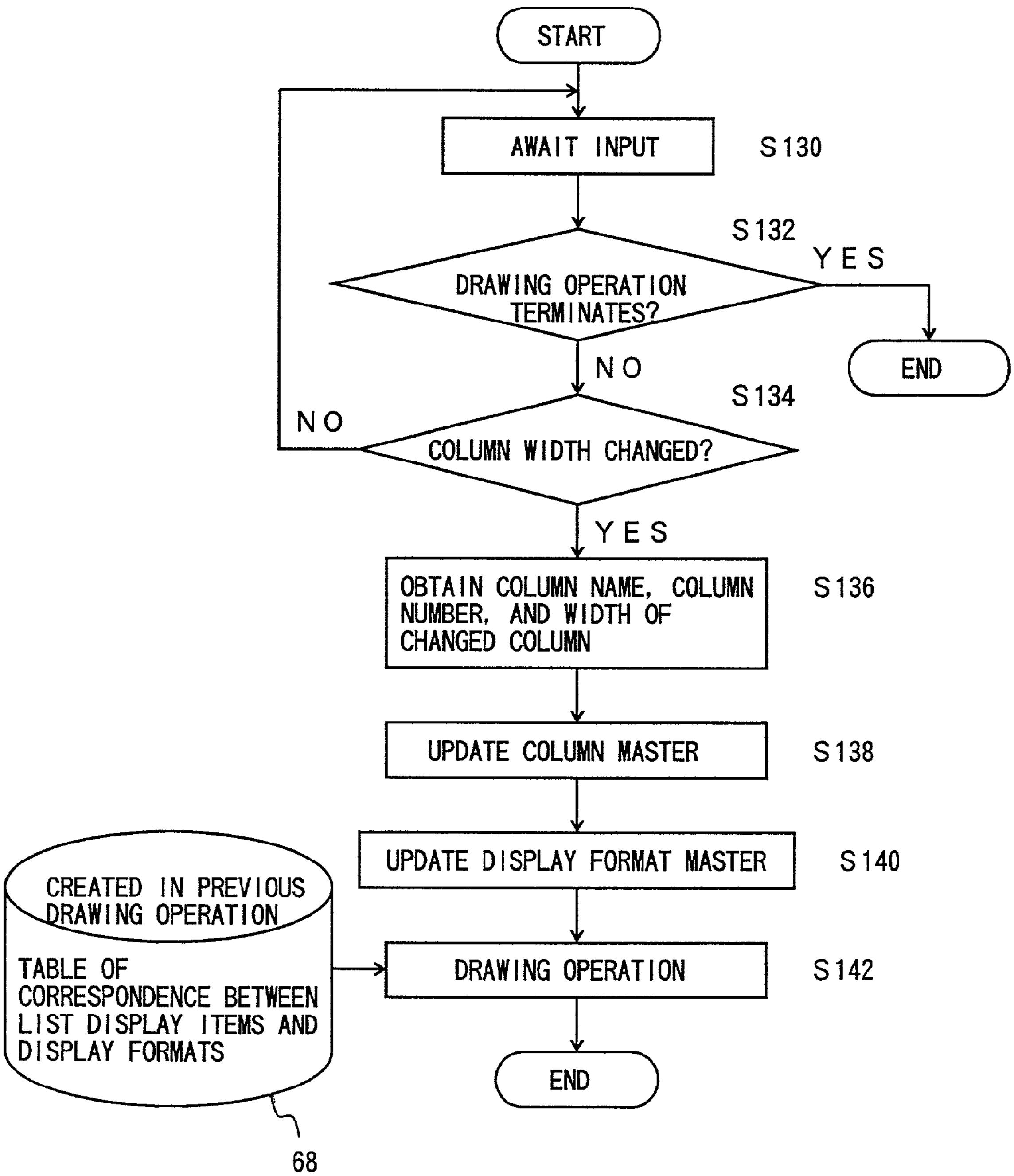
FIG. 28 is a flowchart of a column display width change operation performed by the data item list display apparatus of the present invention.

FIG. 28 is a flowchart of a column display width change operation performed by the data item list display apparatus of the present invention. This operation is performed following the drawing operation. In step S130 of the drawing, an input is awaited. In step S132, it is determined whether the drawing operation is canceled to terminate, and in step S134, it is determined whether a column width is changed.

If a column width is changed, the operation proceeds to step S136 where the column name, column number (icon number), and width of the changed column are obtained. Next, in step S138, the column master 64 updates the column of width of its position corresponding to the column name and column number of the changed column. Then, in step S140, the display format master 62 updates the column of the display area size of each data item of its position corresponding to the column name and column number of the changed column. Thereafter, in step S142, a drawing operation is performed. This drawing operation employs the table 68 of the correspondence between the list display items and the display formats. This table 68 has been created in the previously performed drawing operation. The drawing operation of step S142 is equal to steps S14 through S32 of FIG. 6.

Thus, the width of a specified one of columns displayed in a list can be changed to a desired size to be displayed. Therefore, the users can easily understand the displayed contents of the column.

In this embodiment, a data item can be displayed in the same display format in a list of data items of different attributes and in a list of data items of a single attribute. Therefore, the users can easily understand the lists without confusion, and that at a glance, thus reducing time for overall understanding. Further, numerous data items are displayed in a list on a window so as to be easily understood at a glance, thus allowing even users without specialized knowledge to use a groupware system easily.

Since icons represent the contents of data items in a display thereof, the contents of the data items can be grasped immediately. Further, the types of display forms can be changed by using display formats and icons, the users can freely create display forms in quest of ease of visual recognition. Furthermore, by modifying icons, a list of data items is made understandable to users with low literacy so as to be usable as a teaching material for children of younger age.

Steps S10 through S42 correspond to list display means claimed in the appended claims, the display format master 62, the column master 64, and the icon master 66 correspond to a table of correspondence claimed in the claims, steps S18 through S30 correspond to alignment and display means claimed in the claims, and steps S26, S28, S38, and S42 correspond to area management means claimed in the claims. Further, steps S70 through S128, steps S50 through S64, and steps S130 through S142 correspond to sorting and display means, column header display means, column header width change means each claimed in the claims, respectively.

As previously described, a recording medium as claimed in claim 1 is recorded with a data item list display program for causing a computer to function as list display means for displaying a plurality of data items in different display forms in a list, the display forms corresponding to respective attributes of the data items.

Thus, a plurality of data items are displayed in a list in different display forms corresponding to respective attributes of the data items. Therefore, a data item can be displayed in the same display format in a list of data items of different attributes and in a list of data items of a single attribute. Hence, users can easily understand the lists without confusion, and that at a glance, thus reducing time for overall understanding. Further, numerous data items are displayed in a list on a window so as to be easily understood at a glance, thus allowing even users without specialized knowledge to use a groupware system easily.

According to a recording medium as claimed in claim 2, the program causes the list display means to include a table of correspondence between the attributes and the display forms, and to determine the display forms of the data items displayed in the list by referring to the table by the respective attributes of the data items.

Thus, the list display means includes a table of correspondence between the attributes and the display forms, and determines the display forms of the data items displayed in the list by referring to the table by the respective attributes of the data items. Therefore, by updating the table, the display forms corresponding to the attributes of the data items can be easily changed.

According to a recording medium as claimed in claim 3, the program causes the table to have the display forms corresponding to the attributes and predetermined conditions, and causes the list display means to determine the display forms of the data items displayed in the list by referring to the table by the respective attributes and contents of the data items.

Thus, the table has the display forms corresponding to the attributes and predetermined conditions, and the list display means determines the display forms of the data items displayed in the list by referring to the table by the respective attributes and contents of the data items. Therefore, even if data items are of the same attribute, the data items are displayed in different display forms depending on whether the data items satisfy predetermined conditions, thus making it easy for the users to understand whether the data items satisfy the predetermined conditions.

According to a recording medium as claimed in claim 4, the program causes the list display means to add icons of different sizes corresponding to the display forms to the data items in displaying the data items.

Thus, icons of different sizes corresponding to the display forms are added to the data items in displaying the data items. Therefore, each of the data items can be displayed with an icon of an appropriate size for its display format, and a data item can be displayed with the same icon in a list of data items of different attributes and in a list of data items of a single attribute. Further, since icons represent the contents of data items in a display thereof, the contents of the data items can be grasped immediately. Furthermore, the types of display forms can be changed by using display formats and icons, the users can freely create display forms in quest of ease of visual recognition. Moreover, by modifying icons, a list of data items is made understandable to users with low literacy so as to be usable as a teaching material for children of younger age.

According to a recording medium as claimed in claim 5, the program causes the list display means to function as alignment and display means for aligning and displaying each of the data items of the different display forms.

Thus, each of the data items of the different display forms is aligned and displayed. Therefore, the icons of the data items can be arranged to be displayed in order.

According to a recording medium as claimed in claim 6, the program causes the alignment and display means to function as area management means for managing an area in which data items are displayed and an area required to display the data items of the respective display forms.

Thus, an area in which data items are displayed and an area required to display the data items of the respective display forms are managed. Therefore, the icons of the data items can be arranged to be displayed in order.

According to a recording medium as claimed in claim 7, the program causes the list display means to function as sorting and display means for sorting and displaying the data items of the respective display forms.

Thus, the data items of the respective display forms are sorted and displayed. Therefore, the data items of the respective display forms are rearranged in an order sorted to be displayed so as to be easily understandable to the users.

According to a recording medium as claimed in claim 8, the program causes the list display means to function as column header display means for displaying a column header corresponding to a display form of a selected one of the data items displayed in the list.

Thus, a column header corresponding to a display form of a selected one of the data items displayed in the list is displayed. Therefore, the users can easily understand the displayed contents of the selected one of the data items.

According to a recording medium as claimed in claim 9, the program causes the list display means to function as column display width change means for changing a column display width of one of the data items which one corresponds to a displayed column header by changing a column display width of the displayed column header.

Thus, a column display width of one of the data items which one corresponds to a displayed column header is changed by changing a column display width of the displayed column header. Therefore, if the displayed contents of a data item do not fit in a column display width, the column display width is widened so that more contents can be displayed.

An apparatus as claimed in claim 10 includes list display means for displaying a plurality of data items in different display forms in a list, the display forms corresponding to respective attributes of the data items.

Thus, a plurality of data items are displayed in a list in different display forms corresponding to respective attributes of the data items. Therefore, a data item can be displayed in the same display format in a list of data items of different attributes and in a list of data items of a single attribute. Hence, users can easily understand the lists without confusion.

According to an apparatus as claimed in claim 11, the list display means adds icons of different sizes corresponding to the display forms to the data items in displaying the data items.

Thus, icons of different sizes corresponding to the display forms are added to the data items in displaying the data items. Therefore, each of the data items can be displayed with an icon of an appropriate size for its display format, and a data item can be displayed with the same icon in a list of data items of different attributes and in a list of data items of a single attribute.

According to an apparatus as claimed in claim 12, the list display means includes alignment and display means for aligning and displaying each of the data items of the different display forms.

Thus, each of the data items of the different display forms is aligned and displayed. Therefore, the icons of the data items can be arranged to be displayed in order.

According to an apparatus as claimed in claim 13, the list display means includes sorting and display means for sorting and displaying the data items of the respective display forms.

Thus, the data items of the respective display forms are sorted and displayed. Therefore, the data items of the respective display forms are rearranged in an order sorted to be displayed so as to be easily understandable to the users.

According to an apparatus as claimed in claim 14, the list display means includes column header display means for displaying a column header corresponding to a display form of a selected one of the data items displayed in the list.

Thus, a column header corresponding to a display form of a selected one of the data items displayed in the list is displayed. Therefore, the users can easily understand the displayed contents of the selected one of the data items.

A method as claimed in claim 15 displays a plurality of data items in different display forms in a list, the display forms corresponding to respective attributes of the data items.

By employing this method, the recording medium as claimed in claim 1 and the apparatus as claimed in claim 10 can be realized.

According to a recording medium as claimed in claim 16, the program causes the list display means to change types of fonts based on the display forms of the data items in displaying the data items.

Thus, types of fonts are changed based on the display forms of the data items in displaying the data items. Therefore, each of the data items can be displayed in a suitable type of font for its display format, and a data item can be displayed in the same font type in a list of data items of different attributes and in a list of data items of a single attribute.

According to an apparatus as claimed in claim 17, the list display means changes types of fonts based on the display forms of the data items in displaying the data items.

Thus, the list display means changes types of fonts based on the display forms of the data items in displaying the data items. Therefore, each of the data items can be displayed in a suitable type of font for its display format, and a data item can be displayed in the same font type in a list of data items of different attributes and in a list of data items of a single attribute.

What is claimed is:

1. A computer-readable recording medium recorded thereon with a method of displaying a plurality of data items in a list, the method comprising:

storing a plurality of display forms defining respective ways of displaying the list of data items, the display forms being different from each other in items to be displayed in columns of the list; and displaying each of the data items in the list in a corresponding one of the display forms based on an attribute and a current condition of the data item so that the item to be displayed in a corresponding one of the columns of the list is variable in accordance with the data items.

2. The recording medium as claimed in claim 1, wherein said storing a plurality of display forms comprises storing a table of correspondence between the attributes and the display forms, and said displaying each of the data items in the list comprises determining the display forms of the data items displayed in the list by referring to the table by the respective attributes of the data items.

3. The recording medium as claimed in claim 2, wherein said table includes the display forms corresponding to the attributes and predetermined conditions, and said displaying each of the data items in the list further comprises determining the display forms of the data items displayed in the list by referring to said table by the respective attributes and contents of the data items.

4. The recording medium as claimed in claim 1, wherein said displaying each of the data items in the list comprises adding icons of different sizes corresponding to the display forms to the data items in displaying the data items.

5. The recording medium as claimed in claim 4, wherein said displaying each of the data items in the list further comprises aligning and displaying each of the data items of the different display forms.

6. The recording medium as claimed in claim 5, wherein said displaying each of the data items in the list further comprises managing an area in which data items are displayed and an area required to display the data items of the respective display forms.

7. The recording medium as claimed in claim 5, wherein said displaying each of the data items in the list further comprises sorting and displaying the data items of the respective display forms.

8. The recording medium as claimed in claim 1, wherein said displaying each of the data items in the list comprises displaying a column header corresponding to a display form of a selected one of the data items displayed in the list.

9. The recording medium as claimed in claim 8, wherein said displaying each of the data items in the list further comprises changing a column display width of one of the data items which one corresponds to a displayed column header by changing a column display width of the displayed column header.

10. A data item list display apparatus for displaying a plurality of data items in a list, the apparatus comprising:

a storage part configured to store a plurality of display of forms defining respective ways of displaying the list of data items, the display forms being different from each other in items to be displayed in columns of the list; and a list display part configured to display each of the data items in the list in a corresponding one of the display forms based on an attribute and a current condition of the data item so that the item to be displayed in a corresponding one of the columns of the list is variable in accordance with the data items.

11. The apparatus as claimed in claim 10, wherein said list display part adds icons of different sizes corresponding to the display forms to the data items in displaying the data items.

12. The apparatus as claimed in claim 11, wherein said list display part comprises an alignment and display part to align and display each of the data items of the different display forms.

13. The apparatus as claimed in claim 12, wherein said list display part comprises a sorting and display part to sort and display the data items of the respective display forms.

14. The apparatus as claimed in claim 10, wherein said list display part comprises a column header display part to display a column header corresponding to a display form of a selected one of the data items displayed in the list.

15. A method of displaying a plurality of data items in a list, the method comprising:

storing a plurality of display forms defining respective ways of displaying the list of data items, the display forms being different from each other in items in memory to be displayed in columns of the list; and displaying each of the data items in the list in a corresponding one of the display forms based on an attribute and a current condition of the data item so that the item to be displayed in a corresponding one of the columns of the list is variable in accordance with the data items.

16. The recording medium as claimed in claim 1, wherein said displaying each of the data items in the list comprises changing types of fonts based on the display forms of the data items in displaying the data items.

17. The apparatus as claimed in claim 10, wherein said list display part changes types of fonts based on the display forms of the data items in displaying the data items.

* * * * *

UNITED STATES PATENT AND TRADEMARK OFFICE

CERTIFICATE OF CORRECTION

PATENT NO. : 7,000,196 B2
APPLICATION NO. : 09/854624
DATED : February 14, 2006
INVENTOR(S) : Yoko Kobayashi It is certified that error appears in the above-identified patent and that said Letters Patent is hereby corrected as shown below:

Title Page #63
First Page, Column 1 (Related U.S. Application Data), Line 1, delete "PCT/JP99/06433" and insert -- PCT/JP00/06433 -- therefor.
Column 14, Lines 38-39, after "medium" delete "recorded thereon".
Column 14, Line 40, delete "list" and insert -- list recorded thereon, -- therefor.

Signed and Sealed this

Sixth Day of March, 2007

JON W. DUDAS
*Director of the United States Patent and Trademark Office*